US012793453B2

(12) United States Patent
Marchant et al.

(10) Patent No.: US 12,793,453 B2
(45) Date of Patent: Nov. 10, 2026

(54) MACHINE-LEARNED CONTENT GENERATION VIA PREDICTIVE CONTENT GENERATION SPACES

(71) Applicant: Google LLC, Mountain View, CA (US)

(72) Inventors: Robert Marchant, Richmond (GB); Henry John Holland, London (GB); Tríona Eidín Butler, County Kerry (IE); Corbin Alexander Cunningham, Seattle, WA (US); Gerard Serra Segarra, Barcelona (ES); David Matthew Jones, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/086,846

(22) Filed: Mar. 21, 2025

(65) Prior Publication Data

US 2025/0218088 A1 Jul. 3, 2025

Related U.S. Application Data

(63) Continuation of application No. PCT/US2022/044558, filed on Sep. 23, 2022.

(51) Int. Cl.
*G06V 20/70* (2022.01)
*G06N 20/20* (2019.01)
(Continued)

(52) U.S. Cl.
CPC ............. *G06V 20/70* (2022.01); *G06N 20/20* (2019.01); *G06T 11/23* (2026.01); *G06T 11/60* (2013.01); *G06V 10/761* (2022.01)

(58) Field of Classification Search
CPC .................. G06T 11/60; G06T 11/203; G06T 2207/20081; G06T 2200/24;
(Continued)

(56) References Cited

U.S. PATENT DOCUMENTS

| | | | | |
|---|---|---|---|---|
| 11,488,360 | B1 * | 11/2022 | Good | G06T 19/00 |
| 12,469,180 | B2 * | 11/2025 | Mourkogiannis | G06T 11/60 |

(Continued)

OTHER PUBLICATIONS

International Preliminary Report on Patentability for PCT/US2022/044558, mailed on Apr. 3, 2025, 11 pages.

(Continued)

*Primary Examiner* — Jin Cheng Wang
(74) *Attorney, Agent, or Firm* — DORITY & MANNING, P.A.

(57) ABSTRACT

Systems and methods for content generation are provided. A method includes obtaining data indicative of selection, by a user, of a content element depicted within a predictive content generation space using a tool of the predictive content generation space. The tool is respectively associated with a machine learning tasks. The tool is operable to select at least a portion of each of one or more content elements depicted within the predictive content generation space. The method includes processing data descriptive of the at least the portion of the content element with a machine-learned model to obtain predicted content. The machine-learned model is trained to perform the machine learning task associated with the tool. The method includes generating one or more predicted content elements within the predictive content generation space. The one or more predicted content elements are descriptive of the predicted content.

20 Claims, 16 Drawing Sheets

(51) Int. Cl.
*G06T 11/23* (2026.01)
*G06T 11/60* (2026.01)
*G06V 10/74* (2022.01)

(58) Field of Classification Search
CPC ........ G06T 2207/20084; G06V 10/761; G06V 10/82; G06V 10/764; G06V 10/7788; G06V 20/698; G06N 20/20; G06N 3/08; G06N 3/044; G06N 3/045
See application file for complete search history.

(56) References Cited

U.S. PATENT DOCUMENTS

| | | | | |
|---|---|---|---|---|
| 2013/0136380 | A1 | 5/2013 | Polichroniadis | |
| 2020/0057824 | A1* | 2/2020 | Yeh | G06N 3/0475 |
| 2020/0234025 | A1* | 7/2020 | Cohen | G06V 20/695 |
| 2020/0311990 | A1* | 10/2020 | Chen | G06T 11/23 |
| 2020/0320763 | A1* | 10/2020 | Rodgers | G06T 11/60 |
| 2021/0065448 | A1 | 3/2021 | Goodrich et al. | |
| 2021/0150676 | A1* | 5/2021 | Sytnik | G06T 5/73 |
| 2021/0248376 | A1* | 8/2021 | Zhao | G06V 20/49 |
| 2021/0304482 | A1* | 9/2021 | Park | G06T 13/00 |
| 2022/0138950 | A1* | 5/2022 | Gupta | G06T 7/11 382/173 |
| 2022/0148113 | A1* | 5/2022 | Mejia | G06Q 10/0635 |
| 2022/0156499 | A1* | 5/2022 | Sarkhel | G06F 18/256 |
| 2022/0254076 | A1* | 8/2022 | Fisher | G06V 10/25 |
| 2023/0215010 | A1* | 7/2023 | Soma | G06T 11/40 |
| 2023/0350634 | A1* | 11/2023 | Kumar | G06N 3/0464 |
| 2023/0360271 | A1* | 11/2023 | Jindal | G06T 7/73 |
| 2023/0360284 | A1* | 11/2023 | Cowles | G06T 11/60 |
| 2023/0400971 | A1* | 12/2023 | Tai | G16H 20/10 |
| 2024/0038227 | A1* | 2/2024 | Shaikh | G06Q 10/101 |
| 2025/0086760 | A1* | 3/2025 | Kanazawa | G06T 5/77 |

OTHER PUBLICATIONS

International Search Report and Written Opinion for PCT/US2022/044558, mailed on May 8, 2023, 15 pages.
Ono, “Photoshop Basics: From Beginner to Professional”, Ist Edition, MDN Corporation, May 17, 2022, 39 pages.

* cited by examiner

500

| TOOLS 204 | MACHINE LEARNING TASK 502 | MODEL PROCESSING INSTRUCTIONS 504 | USER HISTORICAL DATA 506 |
|---|---|---|---|
|  204A | CONTENT EXPANSION TASK 502A | { ... } | ... |
|  204B | CONTENT ATOMIZATION TASK 502B | { ... } | ... |
|  204C | CONTENT ANALYSIS TASK 502C | { ... } | ... |
|  204D | PROMPT GENERATION TASK 502D | { ... } | ... |
|  204E | CONTENT SYNTHESIS TASK 502E | { ... } | ... |

MACHINE-LEARNED CONTENT GENERATION VIA PREDICTIVE CONTENT GENERATION SPACES

PRIORITY CLAIM

This Application is a continuation of International Application No. PCT/US2022/044558, filed Sep. 23, 2022. Applicant claims priority to and the benefit of each of such applications and incorporate all such applications herein by reference in its entirety.

FIELD

The present disclosure relates generally to content generation and prediction. More particularly, the present disclosure relates to leveraging predictive content generation spaces to generate content using machine-learned models.

BACKGROUND

Advancements in machine learning have led to the creation of increasingly sophisticated machine-learned models. For example, Large Language Models (LLMs) are trained on quantities of data substantially larger than those used for training conventional language models. By doing so, LLMs can be trained to perform multiple natural language processing tasks. For another example, image processing models can be trained to perform semantic image analysis for images. In other words, in addition to identifying objects depicted in an image, these image processing models can obtain a semantic understanding of the scene itself.

Many of these models are currently utilized to assist users in performing various tasks. For example, a LLM may be utilized to answer questions proposed by users of a search service. For another example, image processing models may be utilized to perform reverse image searches, or to provide image suggestions to users. However, under current implementations, users only utilize these models after identifying a problem, and as such, cannot be effectively leveraged for brainstorming, content discovery, content generation, creative exploration, etc.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for content generation within a predictive content generation space via user-specified machine learning tasks. The method includes obtaining, by a computing system comprising one or more computing devices, data indicative of selection, by a user, of at least a portion of a content element depicted within a predictive content generation space using a first tool of a plurality of tools of the predictive content generation space. The plurality of tools are respectively associated with a plurality of machine learning tasks. Each of the plurality of tools is operable to select at least a portion of each of one or more content elements depicted within the predictive content generation space. The method includes processing, by the computing system, data descriptive of the at least the portion of the content element with a machine-learned model to obtain predicted content, wherein the machine-learned model is trained to perform a first machine learning task respectively associated with the first tool. The method includes generating, by the computing system, one or more predicted content elements within the predictive content generation space, wherein the one or more predicted content elements are descriptive of the predicted content.

Another example aspect of the present disclosure is directed to computing system for content generation within a predictive content generation space via user-specified machine learning tasks. The computing system includes one or more processors. The computing system includes one or more non-transitory computer-readable media that store instructions that, when executed by the one or more processors, cause the computing system to perform operations. The operations include obtaining data indicative of selection, by a user, of at least a portion of a content element depicted within a predictive content generation space using a first tool of a plurality of tools of the predictive content generation space. The plurality of tools are respectively associated with a plurality of machine learning tasks. Each of the plurality of tools is operable to select at least a portion of each of one or more content elements depicted within the predictive content generation space. The operations include processing data descriptive of the at least the portion of the content element with a machine-learned model to obtain predicted content, wherein the machine-learned model is trained to perform a first machine learning task respectively associated with the first tool. The operations include one or more predicted content elements within the predictive content generation space, wherein the one or more predicted content elements are descriptive of the predicted content.

Another example aspect of the present disclosure is directed to one or more non-transitory computer-readable media that store instructions that, when executed by one or more processors of a computing system, cause the computing system to perform operations. The operations include obtaining data indicative of selection, by a user, of at least a portion of a content element depicted within a predictive content generation space using a first tool of a plurality of tools of the predictive content generation space. The plurality of tools are respectively associated with a plurality of machine learning tasks. Each of the plurality of tools is operable to select at least a portion of each of one or more content elements depicted within the predictive content generation space. The operations include processing data descriptive of the at least the portion of the content element with a machine-learned model to obtain predicted content, wherein the machine-learned model is trained to perform a first machine learning task respectively associated with the first tool. The operations include one or more predicted content elements within the predictive content generation space, wherein the one or more predicted content elements are descriptive of the predicted content.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
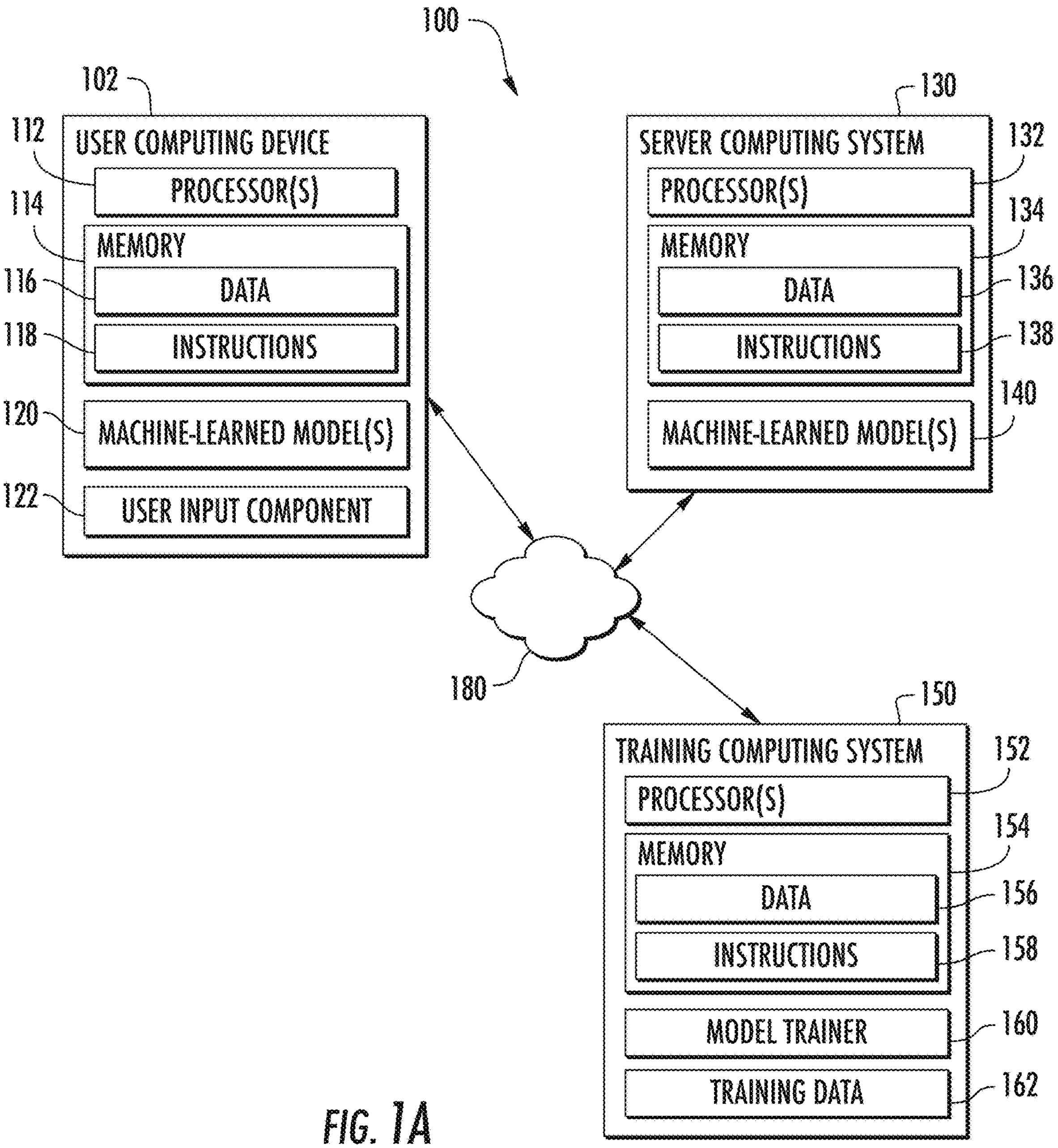
FIG. 1A depicts a block diagram of an example computing system that performs content generation within a predictive content generation space according to some implementations of the present disclosure.

Reference numerals that are repeated across plural figures are intended to identify the same features in various implementations.

DETAILED DESCRIPTION

Overview

Generally, the present disclosure is directed to content generation and prediction. More particularly, the present disclosure relates to leveraging predictive content generation spaces to generate content using machine-learned models. For example, a computing system (e.g., a user device, a server hosting a predictive content generation space service, etc.) can obtain data indicating that a user has selected some (or all) of a content element depicted within a predicted content generation space using one of a number of tools. The predictive content generation space can be a two-dimensional space or three-dimensional space (e.g., Augmented Reality (AR)/Virtual Reality (VR) space, etc.) in which content elements are depicted. Content elements can be interface elements that include image(s), video data, textual content, Uniform Resource Locators (URLs), audio data, etc. A user can interact with content elements via various tools. Each of these tools can correspond to a different machine learning task. As such, by selecting a content element with a certain brush (e.g., by drawing a line through the content element with the brush, etc.), a user can indicate the machine learning task they wish to be performed.

To follow the previous example, the user may select a content element including an image of a cat with a content analysis brush that corresponds to a content analysis task. The computing system can process data descriptive of the content element (e.g., metadata associated with the image of the cat, etc.) with a machine-learned model that is trained to perform the content analysis task to obtain predicted content. For example, the predicted content may be textual content that describes information regarding the breed of the cat depicted in the image, clarifying prompts to the user that correspond to the image of the cat, etc.

The computing system can generate predicted content element(s) descriptive of the predicted content. For example, if the predicted content includes an image similar to the input image and textual content regarding the breed of the cat depicted in the input image, the computing system may generate a predicted content element that includes both the similar image and the textual content within the predicted content element. In such fashion, the predictive content generation space can be leveraged alongside sophisticated machine learned models to increase user efficiency, creativity, and productivity Implementations of the present disclosure provide a number of technical effects and benefits. As one example technical effect and benefit, users that utilize conventional model implementations for content generation (e.g., search engines, reverse image search services, language processing services, etc.) must navigate between various discrete services that are only configured to perform narrowly defined tasks. For example, a user can utilize a reverse image search service to find output images similar to an input image. If the user desired to gain additional information regarding an entity depicted in an output image, the user would be forced to store their output images locally while attempting to navigate to a different service for semantic image analysis, therefore unnecessarily utilizing a substantial quantity of compute resources (e.g., power, memory, storage, bandwidth, compute cycles, etc.). However, implementations of the present disclosure facilitate efficient exploration and generation of content by leveraging sophisticated machine-learned models in conjunction with a continuous predictive content generation space that provides a variety of tools to the user. By providing a more efficient content generation space, implementations of the present disclosure can substantially reduce the quantity of compute resources spent by users.

Furthermore, implementations of the present disclosure can in effect provide alternative graphical shortcuts within a graphical user interface allowing a user to directly access and configure machine-learned model tools, as well as specifying the inputs to said models.

With reference now to the Figures, example embodiments of the present disclosure will be discussed in further detail.

Example Devices and Systems

FIG. 1A depicts a block diagram of an example computing system 100 that performs content generation within a predictive content generation space according to some implementations of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 5-7.

In some implementations, the one or more OVERALL models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel machine learning tasks across multiple instances of the machine-learned model(s) 120).

More particularly, the machine-learned model(s) 120 can be one or more models trained to perform various machine learning tasks. For example, the machine-learned model(s) 120 may be or otherwise include a Large Language Model (LLM) that is trained to perform a variety of natural language processing tasks. For another example, the machine-learned model(s) 120 may include a semantic image processing model that trained to perform semantic image analysis tasks (e.g., recognizing depicted entities, scene determination, etc.). Additionally, or alternatively, in some implementations, the machine-learned model(s) 120 may be or otherwise include a machine-learned model pipeline, ensemble, etc. that includes multiple machine-learned models which are configured to process an input in a certain order (e.g., an order that corresponds to a machine learning task).

For example, a content expansion task (e.g., a task to find content similar to an input) may specify that a machine-learned semantic image processing model is to process an input image to obtain a semantic description of the input image, and then a machine-learned content retrieval model is to process the semantic description to retrieve predicted content similar to the input. As such, it should be broadly understood that machine-learned model(s) 120 may be or may otherwise include any sort of grouping or collection of machine-learned model(s).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service (e.g., a predictive content generation space service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 5-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data sufficient to train sophisticated models such as LLMs or semantic image processing models (e.g., language data, image data, etc.).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
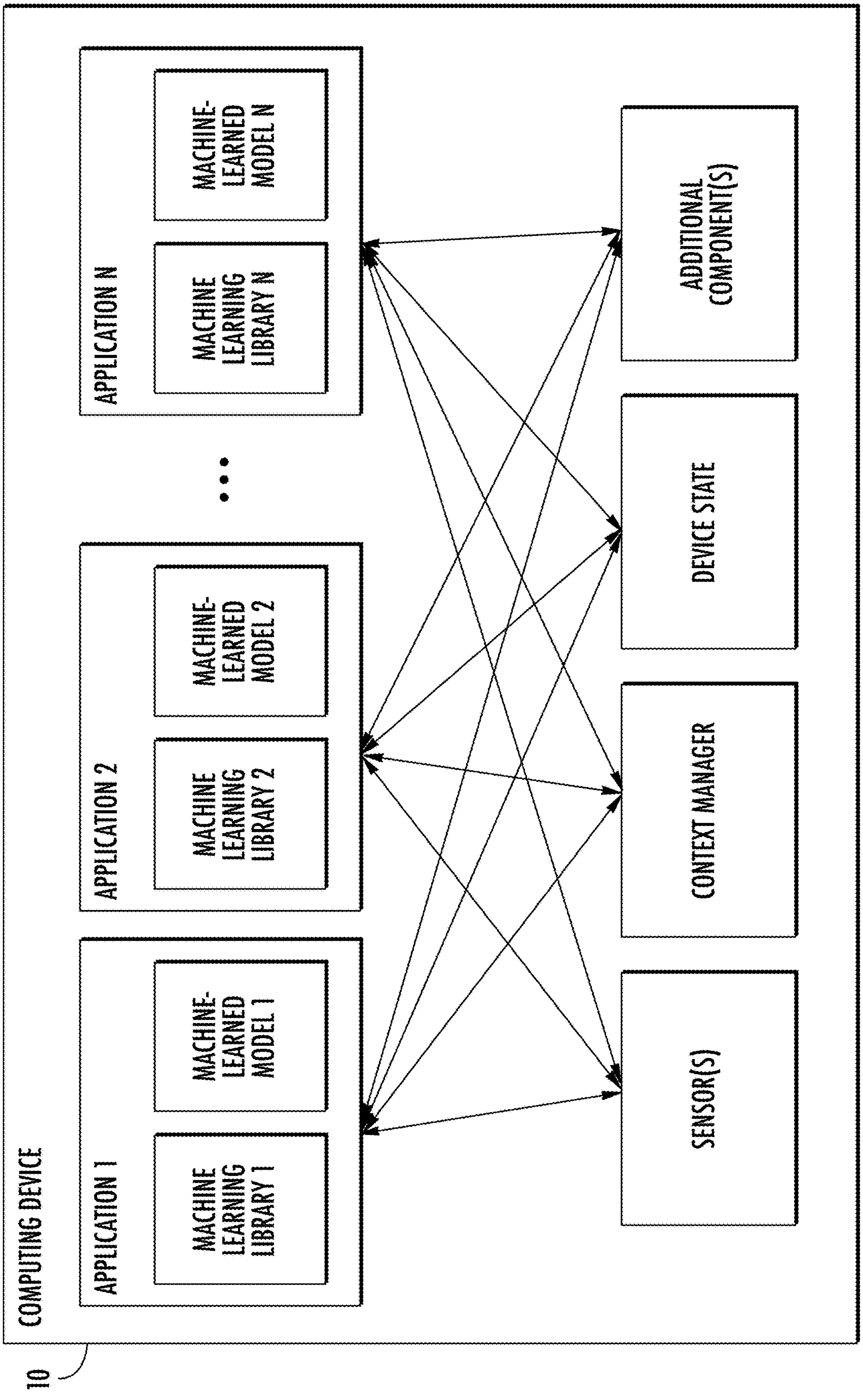
FIG. 1B depicts a block diagram of an example computing device that performs content generation within a predictive content generation space according to some implementations of the present disclosure.

FIG. 1B depicts a block diagram of an example computing device 10 that performs content generation within a predictive content generation space according to some implementations of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
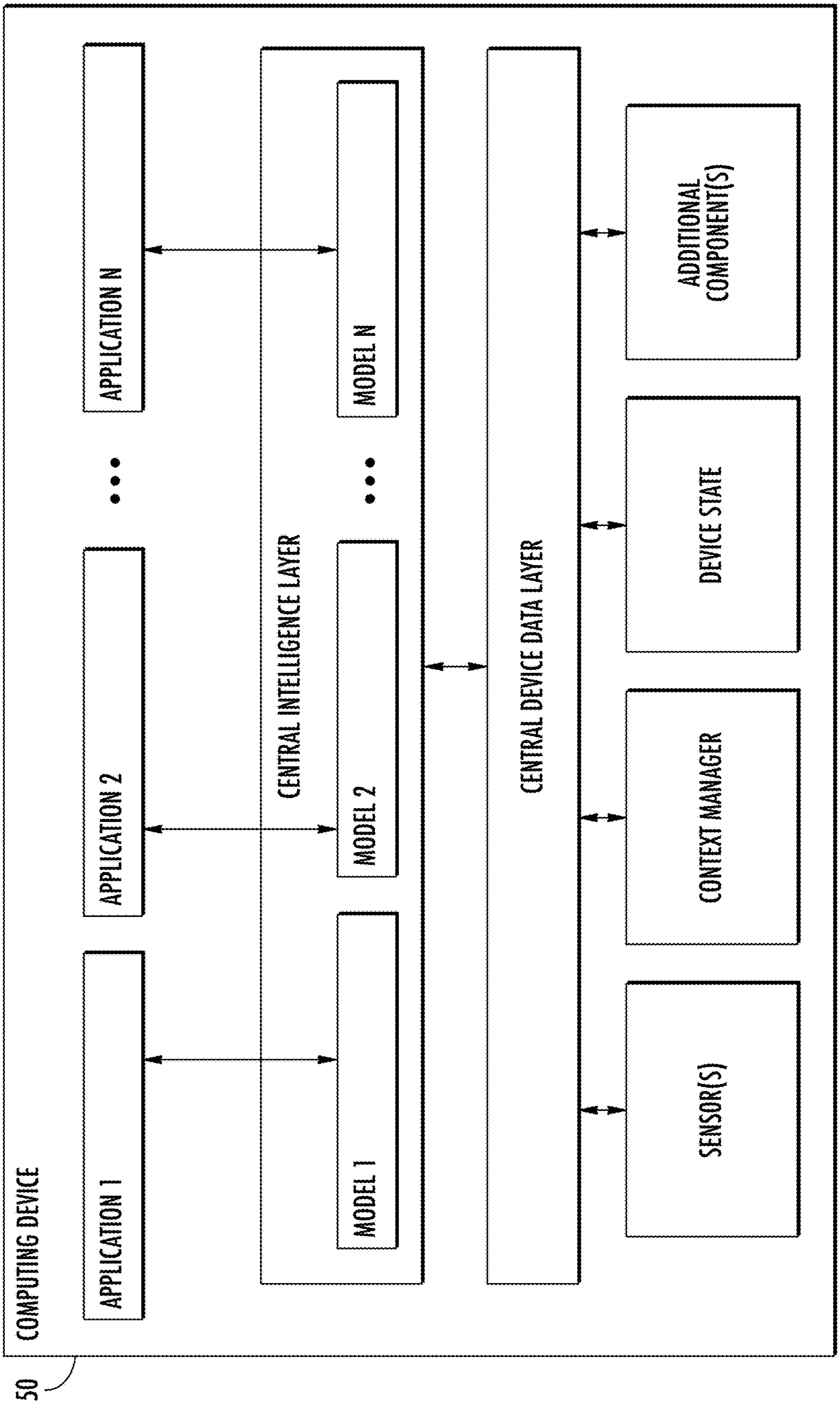
FIG. 1C depicts a block diagram of an example computing device that performs training of machine-learned model(s) for predictive content generation according to some implementations of the present disclosure.

FIG. 1C depicts a block diagram of an example computing device 50 that performs training of machine-learned model(s) for predictive content generation according to some implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2A:
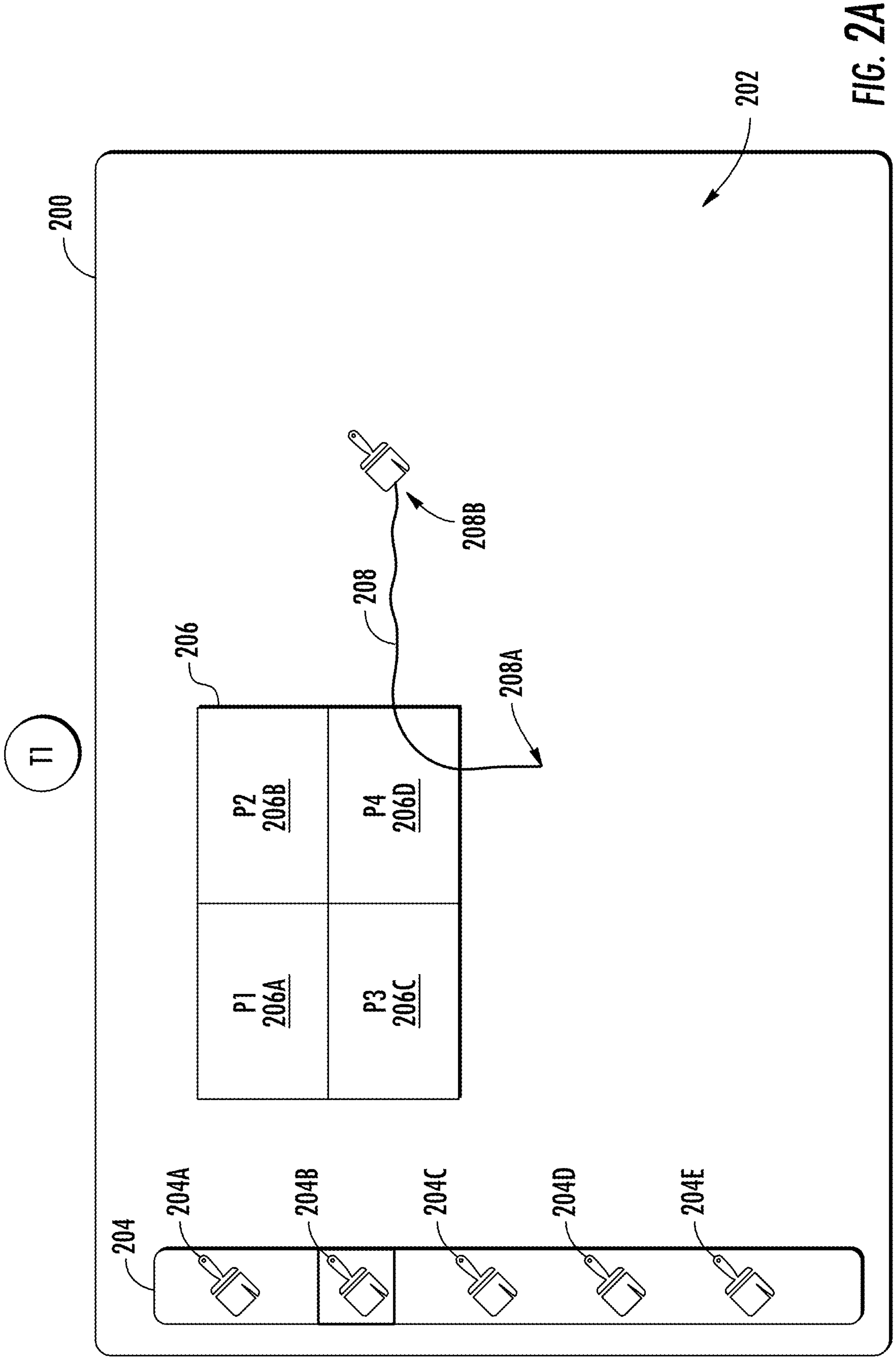
FIG. 2A depicts an example layout of an interface for a predictive content generation space at a first time according to some implementations of the present disclosure.

FIG. 2A depicts an example layout for interface 200 for a predictive content generation space at a first time according to some implementations of the present disclosure. Specifically, as depicted, the interface 200 for the predictive content generation space is a two-dimensional interface 200 that includes a background 201 and a toolbar 204 that includes tools 204A, 204B, 204C, 204D, and 204E. The background of the interface 200 is a solid background, such as a whiteboard background. It should be noted that FIGS. 2A-4B only depict a two-dimensional whiteboard to more clearly illustrate various aspects of the present disclosure. However, implementations of the present disclosure are not limited to any manner of background or interface. For example, the background 202 of the interface 200 may instead depict a traditional chalkboard background. For another example, the background 202 of the interface 200 may depict a user-selected background.

Additionally, or alternatively, in some implementations, the interface 200 may be overlaid atop an interface of a separate application. For example, the predictive content generation space may be an operating system (OS)-level feature that can be executed concurrently with other applications. The user may browse internet content via a web browser, and then may execute the predictive content generation space. The background 202 of the interface 200 may be the webpage being browsed by the user.

Figure 5:
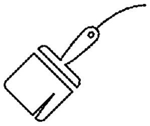
FIG. 5 depicts a data structure that associates tools with machine learning tasks according to some implementations of the present disclosure.
Figure 5:
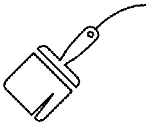
Figure 5:
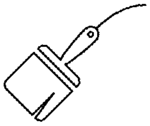
Figure 5:
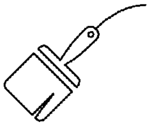
Figure 5:
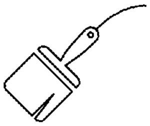

The interface 200 can include the toolbar 204, which provides access to tools 204A-204E. Tools 204A-204E are brush tools that can be utilized by a user to generate (i.e., draw) lines, shapes, dots, etc. within the interface 200 of the predictive content generation space. As depicted in FIG. 5, each of the tools 204A-204E can be respectively associated with a machine learning task of a number of machine learning tasks.

Turning to FIG. 5, FIG. 5 depicts a data structure 500 that associates tools 204A-204E with machine learning tasks according to some implementations of the present disclosure. For example, tool 204A can be associated with content expansion task 502A. Tool 204B can be associated with content atomization task 502B. Tool 204C can be associated with content analysis task 502C. Tool 204D can be associated with prompt generation task 502D. Tool 204E can be associated with content synthesis task 502E. In some implementations, the machine learning tasks 502 can each be associated with model processing instructions 504. The model processing instructions 504 can indicate a series of processing steps required to complete a corresponding machine learning task 502. For example, for an input image with content expansion task 502A, the corresponding model processing instructions 504 may indicate that the image should be processed with a machine-learned semantic processing model to obtain an intermediate output, and then process the intermediate output with a machine-learned retrieval model to obtain predicted content.

In some implementations, the tools 204A-204E can be associated with user historical data 506. The user historical data 506 can describe prior utilization of the tools 204A-204E by a particular user. For example, user historical data 506 may indicate that a user rarely utilizes tool 204D, but commonly utilizes tool 204A. As such, if automatically selecting a tool 204A-204E for the user, a computing system (e.g., server computing system 130, user computing device 102, etc.) can determine which of the tools 204A-204E based on the user historical data 50.

Returning to FIG. 2A, it should be noted that although the tools 204A-204E are depicted as brush tools, the tools 204A-204E are not necessarily limited to brush tool implementations. Rather, the toolbar 204 may include any manner of tool operable to select content elements 206 within an interface 200 of a predictive content generation space. For example, the tool 204A may instead be a box tool that the user can use to surround content items of interest. For another example, the tool 204A may instead be a writing tool that allows a user to write instructions directly to the interface 200 of the predictive content generation space.

The interface 200 of the predicted content generation space can include one or more content elements 206. As depicted, the content element 206 can include multiple portions 206A, 206B, 206C, and 206D. Each of these portions may depict one or more entities within the content element. As described previously, the content element 206 may include any type or combination of multimedia content (e.g., audio data, textual content, URLs, video data, image(s), three-dimensional representation(s), video games, web pages, summarizations, live streams, etc.).

At a first time T1, a user can utilize a tool of the toolbar 204 to select at least a portion of the content element 206 depicted within the interface 200 of the predictive content generation space. As depicted, the user has provided a selection input 208 using tool 204B which intersects portion 206D of the content element 206. Specifically, the selection input 208 is a line that begins at location 208A, intersects portion 206D, and ends at location 208B. In some implementations, by intersecting portion 206D with the selection input 208, the user can select portion 206D of the content element 206 while excluding portions 206A-206C. Alternatively, in some implementations, by intersecting portion 206D with the selection input 208 may select the entirety of content element 206 (e.g., all portions 206A-206D, etc.).

It should be noted that, although the predictive content generation space is depicted as a two-dimensional space, it is not limited to two-dimensional spaces. For example, the predictive content generation space may be a virtual three-dimensional space, and the interface 200 may be displayed within the display device of an Augmented Reality (AR)/Virtual Reality (VR) device. In some implementations, the toolbar 204 may include tools for a three-dimensional environment. For example, tool 204A may be a wand that allows the user to draw in three dimensions. For another example, the tool 204A may simulate interaction between the user's appendages and augmented reality elements (e.g., three-dimensional renderings, etc.) to allow a user to directly interact with the content element with their hands as an augmented reality element. For example, a content element may be a three-dimensional box that is indicative of a video on a video sharing site. The user can provide a selection input by touching the content element. In response, the video may be played within the box, or alternatively, may be played directly to the user via a different interface (e.g., a two-dimensional interface 200, etc.). In such fashion, the interface 200 may switch between a two-dimensional interface and a three-dimensional interface to facilitate user interaction with content elements using the tools of the toolbar 204.

It should be noted that, although not depicted, the user can directly provide the content element 206 to the interface 200 for the predictive content generation space. For example, the content element 206 can be an image, and the user can "drag and drop" the content element 206 from a file storage system to the interface 200 for the predictive content generation space to initiate an upload of the image to the interface 200. For another example, the user may directly input textual content to the interface 200 in a free-form manner (e.g., clicking a location on the interface 200 and typing can create a "text box" in which a content element including textual content can be created). For yet another example, the user may copy a URL to a video hosted at a hosting website and paste the URL to the interface 200. The video can then be directly displayed within content element 206. As such, it should be broadly understood that the interface 200 can be configured such that a user can "drop", upload, or otherwise provide any form or manner of content to the interface 200 (e.g., video, images, search queries, multimodal search queries, video games, AR/VR objects, URLs, web applications, virtual compute instances, etc.), and the content can then be displayed within a content element (e.g., content element 206) of the interface 200.

For example, in some implementations, the content element 206 may be a query (e.g., a query image, a textual query, a spoken utterance including a query, etc.). For example, the interface 200 for the predictive content generation space may allow the user to generate textual content directly within the predictive content generation space. The user can then select the content element (e.g., the query) to perform a search.

Additionally, or alternatively, in some implementations, the content element 206 can include multiple content elements that collectively form a multimodal search query. For example, the user may enter a textual query for "blue shoes" in a text box content element depicted in the interface 200. The user may then "drag and drop" an image of white shoes within the interface 200 to form a content element that includes the image of the white shoes. The user can select both the text box content element and the image content element to provide a multimodal search query that can be processed with a machine-learned model.

Figure 2B:
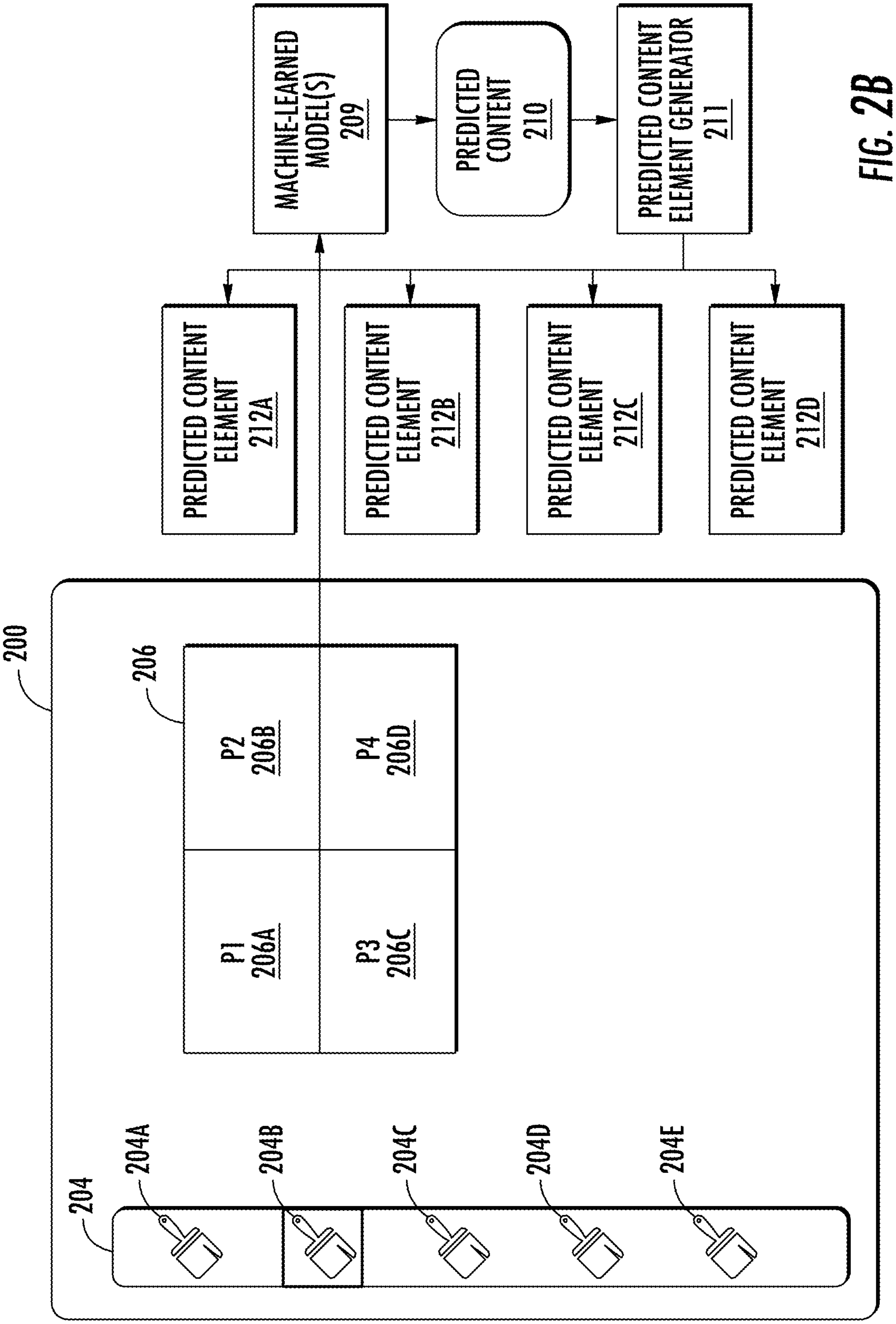
FIG. 2B depicts an example interface for machine-learned generation of predictive content elements within a predictive content generation space according to some implementations of the present disclosure.

FIG. 2B depicts an example interface 200 for machine-learned generation of predictive content elements within a predictive content generation space according to some implementations of the present disclosure. Specifically, the portion 206D of the content element 206 selected by the user with the selection input 208 can be processed with machine-learned model(s) 209 (e.g., machine-learned model(s) 120 or 140 of FIG. 1A, etc.) to obtain predicted content 210. The machine-learned model(s) 209 can be machine-learned model(s) that are trained to perform a machine learning task associated with the tool 204B. For example, the data descriptive of portion 206D may be image data. The tool 204B can be associated with a machine learning task for content expansion (e.g., retrieval of content similar to the input content, etc.). The machine-learned model(s) 209 may be, or otherwise include, a semantic image processing model that is trained to process an input image and retrieve (or generate) images that are semantically similar. The predicted content 210 can include the retrieved/generated images or may instead include data indicative of the images (e.g., hyperlinks to a hosting location of the image, pointers to where the images are stored in memory, etc.).

It should be noted that the machine learning tasks for which the machine-learned model(s) 209 are trained can be tasks for which the output includes multiple types of media. To follow the previous example, the machine-learned model(s) 209 may include another model (or the same model) that is configured to retrieve information regarding the data descriptive of the image included in portion 206D. For example, the semantic image processing model of the previous example may process the data descriptive of the image of the portion 206D to obtain a semantic description output. One model may retrieve similar images using the semantic description output (or the images may be retrieved conventionally), while another model may generate or retrieve information regarding the semantic description output. For example, the portion 206D may depict a duck swimming in a pond. The semantic description output may indicate that the image depicts the duck swimming in the pond. The other model of the machine-learned models 209 may generate information regarding the history of ducks (e.g., a large language model, etc.).

Based on the predicted content 210, a predicted content element generator 211 can generate predicted content elements 212A-212D. The predicted content elements 212A-212D content elements are descriptive of the predicted content 210. For example, the predicted content 210 may include an image. The predicted content element 212A may depict or otherwise include the image. For another example, the predicted content 210 may include textual content. The predicted content element 212A may include the textual content, a summarization of the textual content, or a link to a location at which the textual content is hosted. For yet another example, the predicted content 210 may include a cloud-based video game. The predicted content element 210A may include configured as to execute the cloud-based video game when the predicted content element 212A is selected by the user.

It should be noted that the operations of the machine-learned model(s) 209 and the predicted content element generator 211 are depicted as occurring outside the interface 200 only to indicate that the operations are not depicted within the interface 200. As such, the depicted location of the machine-learned model(s) 209 and the predicted content element generator 211 should not be interpreted as indicating which computing device(s) are utilized to perform the operations of the machine-learned model(s) 209 and the predicted content element generator 211.

Figure 2C:
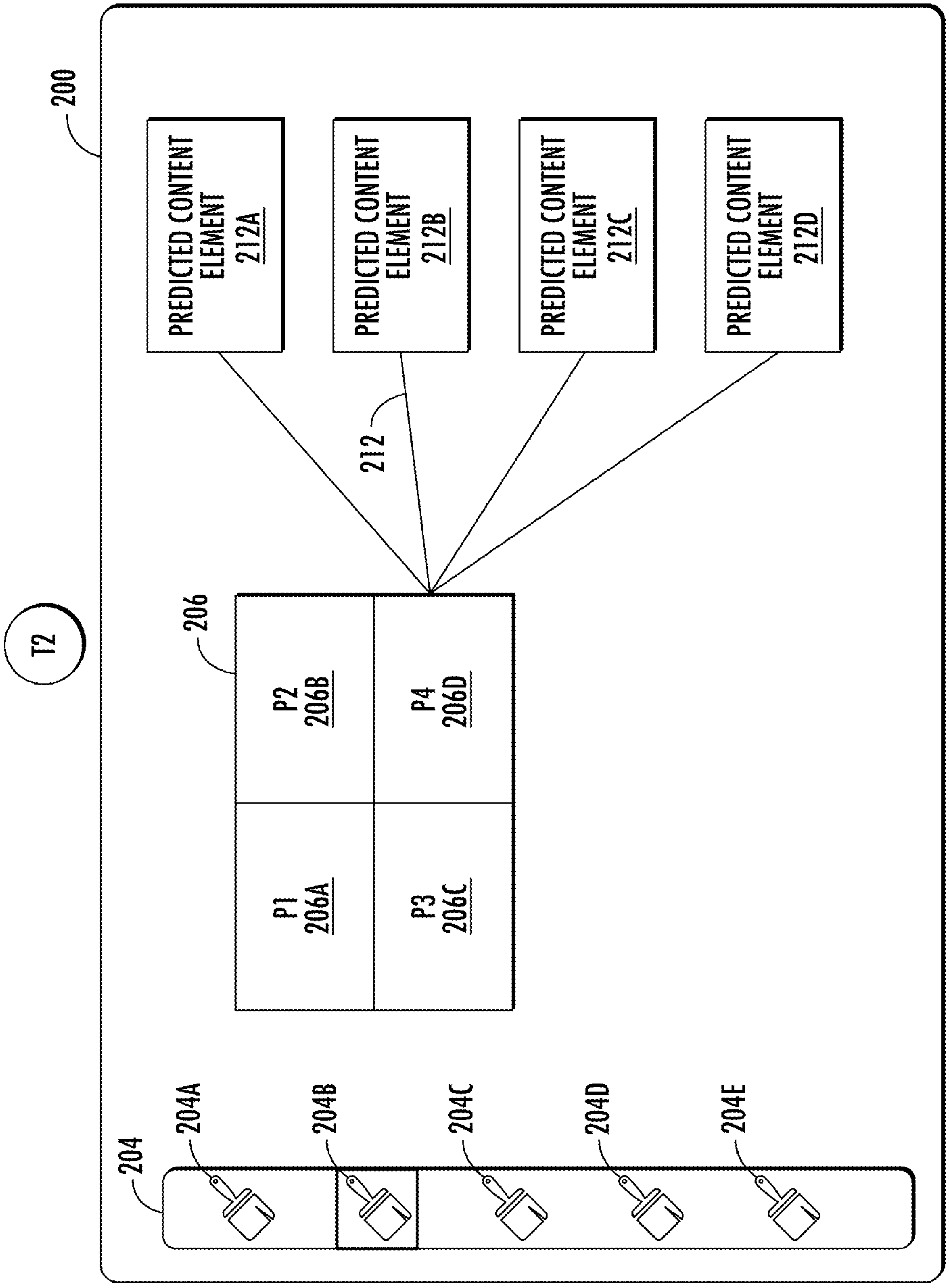
FIG. 2C depicts an example layout for an interface for a predictive content generation space at a second time according to some implementations of the present disclosure

FIG. 2C depicts an example layout for an interface 200 for a predictive content generation space at a second time according to some implementations of the present disclosure. Specifically, at time T2, the predicted content elements 212A, 212B, 212C, and 212D are generated and depicted within the interface 200 of the predictive content generation space. In some implementations, connection interface elements 212 can be generated within the predictive content generation space. The connection interface elements 212 can depict the connection between the predicted content elements 212A-212D and the portion 206D of the content element 206.

It should be noted that, in some implementations, the predicted content elements 212A-212D can be generated and depicted at a location within the interface 200 at which the user ended the selection input 208. For example, as depicted in FIG. 2A, the user ended their selection input 208 at location 208B. Accordingly, the predicted content elements 212A-212D are generated and depicted at roughly the same location as location 208B. Alternatively, in some implementations, the location at which the predicted content elements 212A-212D are generated and depicted can be determined in some other manner (e.g., based on user preferences, user historical data, a type of content of the predicted content elements 212A-212D, etc.).

At time T2, the portion 206D of the content element 206 selected by the user selection input 208 has been processed with a machine-learned model. More specifically, data descriptive of the portion 206D has been processed with a machine-learned model to obtain predicted content. The machine-learned model can be a model trained to perform a machine-learning task associated with the tool 204B. The predicted content elements 210A, 210B, 210C, and 210D can be generated based on the predicted content.

Figure 2D:
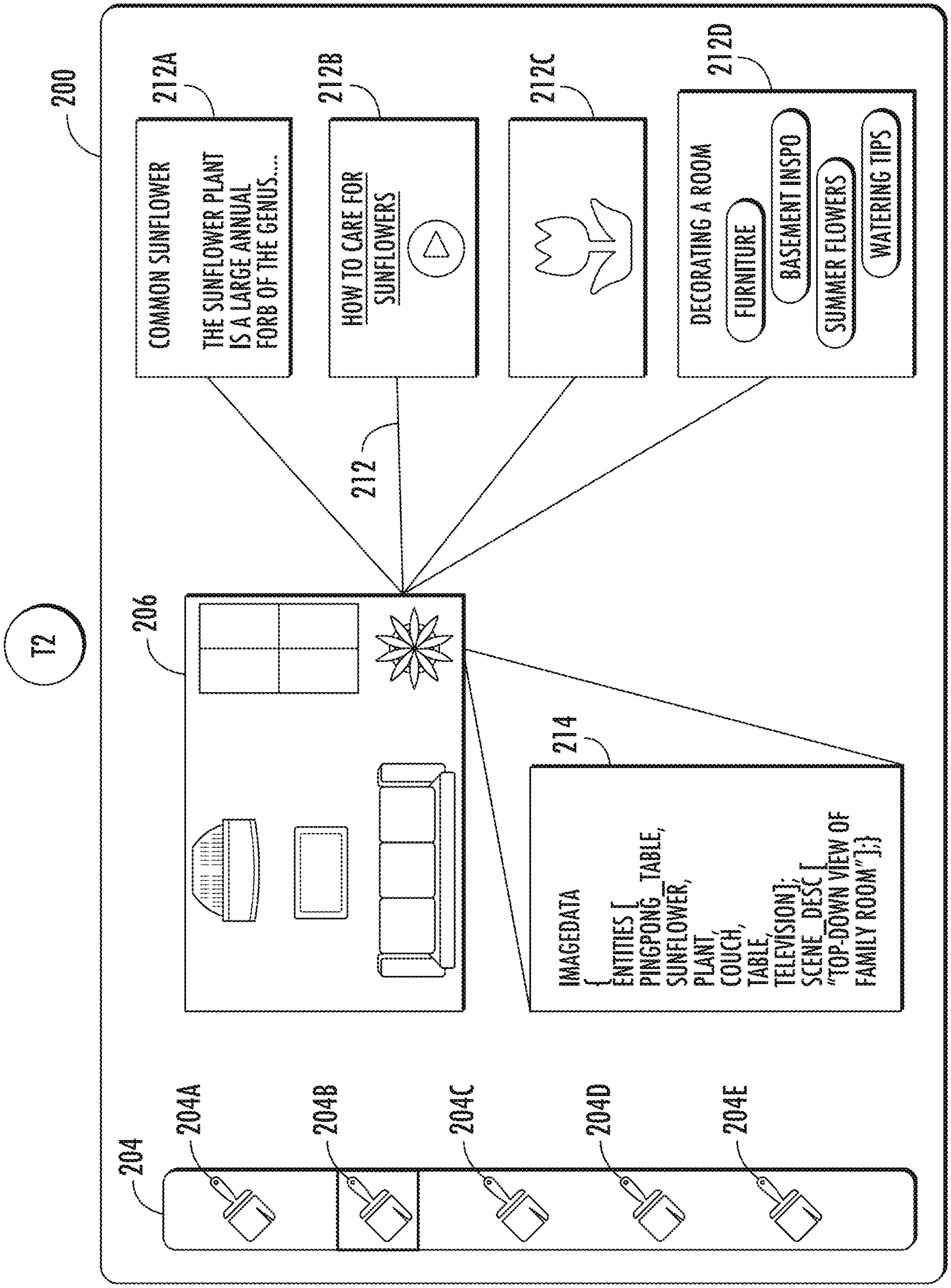
FIG. 2D depicts content elements and predicted content elements within the interface of the predictive content generation space at a second time according to some implementations of the present disclosure.

FIG. 2D depicts content elements and predicted content elements within the interface 200 of the predictive content generation space at a second time according to some implementations of the present disclosure. Specifically, it should be noted that FIG. 2C merely presents an alternate view of FIG. 2C that shows the content depicted within the content elements 206 and 212A-212D, rather than the layout of the content elements 206 and 212A-212D. For example, content element 206 includes an image that depicts a top-down layout of a room. The room includes a sofa, a television, a table, a plant, and a ping-pong table.

As depicted, the plant is located within the portion 206D of the content element 206 that the user selected with the selection input 208 using the tool 204B. As such, the predicted content elements 212A-212D include content that corresponds to the machine learning task associated with tool 204B. In the present example, the tool 204B can be a content expansion tool, which is a task to find content similar to the content of the portion 206D. To follow the present example, plant depicted in portion 206D can be a sunflower. The predicted content 210 retrieved or generated using the machine-learned models 209 can be related to sunflowers. For example, content element 212A can include information regarding sunflower plants (e.g., retrieved from an online dictionary, synthesized using a large language model, etc.). The predicted content element 212B can include an image and a link to a video hosted on a video sharing site related to caring for sunflowers. The predicted content element 212C can be an image of a sunflower. The predicted content element 212D can be a grouping of concept tags that are related to decorating a room (i.e., the purpose of the sunflower). For example, if a user selects the furniture content tag from the predicted content element 212D (e.g., with a touch input, click input, etc.), second content elements may be generated that include predicted content regarding furniture. This furniture may be related to the furniture depicted in other portions of content element 206.

Additionally, FIG. 2D illustrates data 214 that is descriptive of the content element 206. Specifically, the data descriptive of the content element 206 is metadata 214 regarding the image that collectively depicts the top-down view of the room. For example, the metadata 214 describes each entity that is depicted within the room (e.g., the television, couch, table, plant, etc.). Additionally, the metadata 214 can describe a semantic view of the image (e.g., the image depicts a top-down view of a family room"). In some implementations, the metadata may already be included in the content element 206. For example, the content element can include the image depicting the room and the image can include the metadata 214. Alternatively, in some implementations, metadata 214 can be determined. For example, the content element 206 may be processed with the machine-learned model(s) 209 to determine the metadata 214.

It should be noted that although the metadata 214 describes the entire content element 206, it may instead only describe a relevant portion of the content element 206. To follow the previous example, after the user selects the portion 206D with the selection input 208, the metadata 214 may be determined for the portion 206D.

Figure 3A:
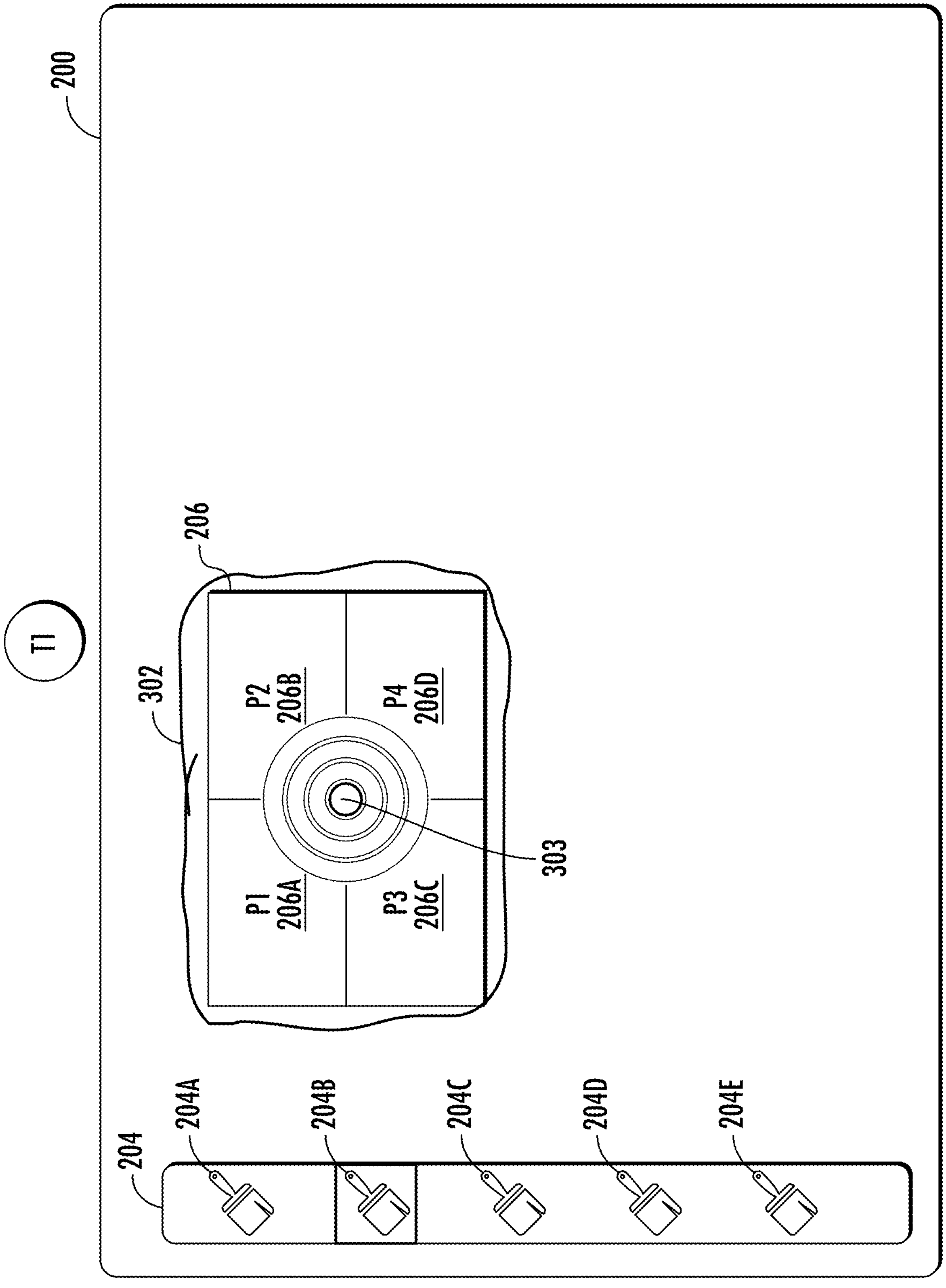
FIG. 3A illustrates an example layout for the interface in which alternative user selection inputs are provided at the first time according to some other implementations of the present disclosure.

FIG. 3A illustrates an example layout for the interface 200 in which alternative user selection inputs are provided at the first time according to some other implementations of the present disclosure. Specifically, as depicted in FIG. 2A, the selection input 208 from the user may be a line that intersects a portion of the content element 206. However, the user is not limited to such selection inputs, nor is the user limited to selection of portion(s) of the content element 206. For example, as depicted, the user may provide a selection input 302 that is a closed shape input. Specifically, the user can draw a closed shape around the content element 206 with the brush tool 204B to perform a selection input 302 that selects the entirety of the content element 206. In such fashion, the user can indicate an interest in all portions of the content element 206, rather than a specific portion.

Alternatively, in some implementations, the user can perform a click input 303. Specifically, the user can select the brush tool 204B and then draw a "dot" (i.e., click or touch a location on the interface 200) to perform a selection input 302 that selects a portion, or the entirety, of the content element 206. For example, the user may click towards the center of the content element 206 to indicate an interest in the entirety of the content element 206. For another example, the user may click to provide a selection input 303 further from the center of the content element 206 to indicate an interest in a particular portion of the content element 206. In some implementations, an intent of the user associated with the selection input 303 may be determined based on user historical data and/or the content of the content element 206.

Figure 3B:
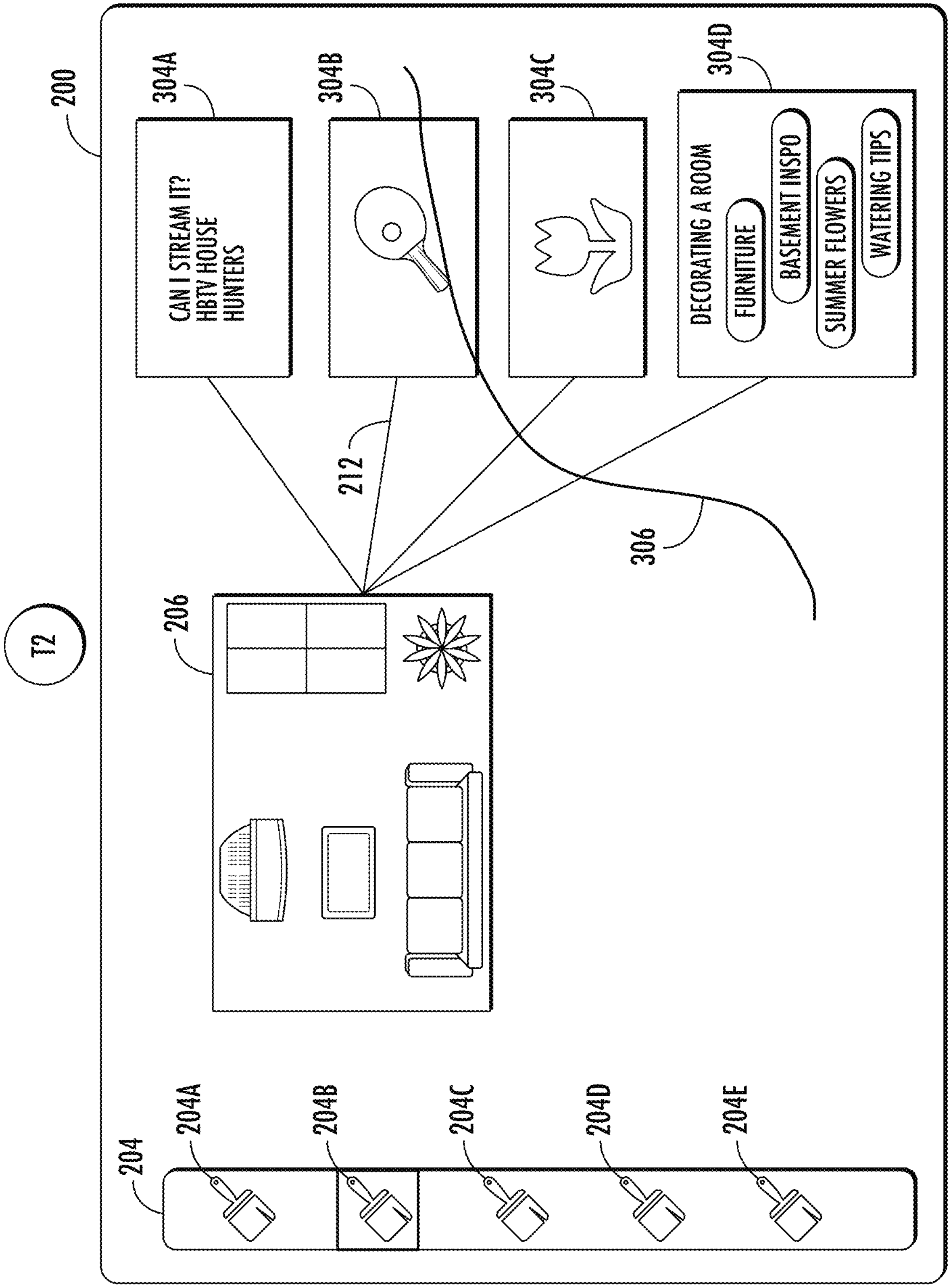
FIG. 3B depicts predicted content elements corresponding to selection of the entirety of the content element within the interface at the second time according to some implementations of the present disclosure.

FIG. 3B depicts predicted content elements corresponding to selection of the entirety of the content element 206 within the interface 200 at a second time according to some implementations of the present disclosure. Specifically, at time T2, after the entirety of the content element 206, predicted content elements 304A, 304B, 304C, and 304D are generated and depicted within the interface 200 as described with regards to predicted content elements 212A-212D.

For example, the predicted content element 304A can include a summarization of a website indicating whether a show related to homes can be streamed. The predicted content element 304B can include a picture of a popular ping pong racket among professional players. The predicted content element 304C can include the same image of the sunflower as the predicted content element 212C of FIG. 2D. The predicted content element 304D can include the same grouping of concept tags that are related to decorating a room as predicted content element 212D of FIG. 2D. FIG. 3B also depicts a second selection input 306 made by the user using the tool 204B. Additionally, the user has provided a second selection input 306 using the brush tool 204B. The second selection input 306 selects the predicted content element 304B which depicts the ping pong racket that is popular among professional players.

Figure 3C:
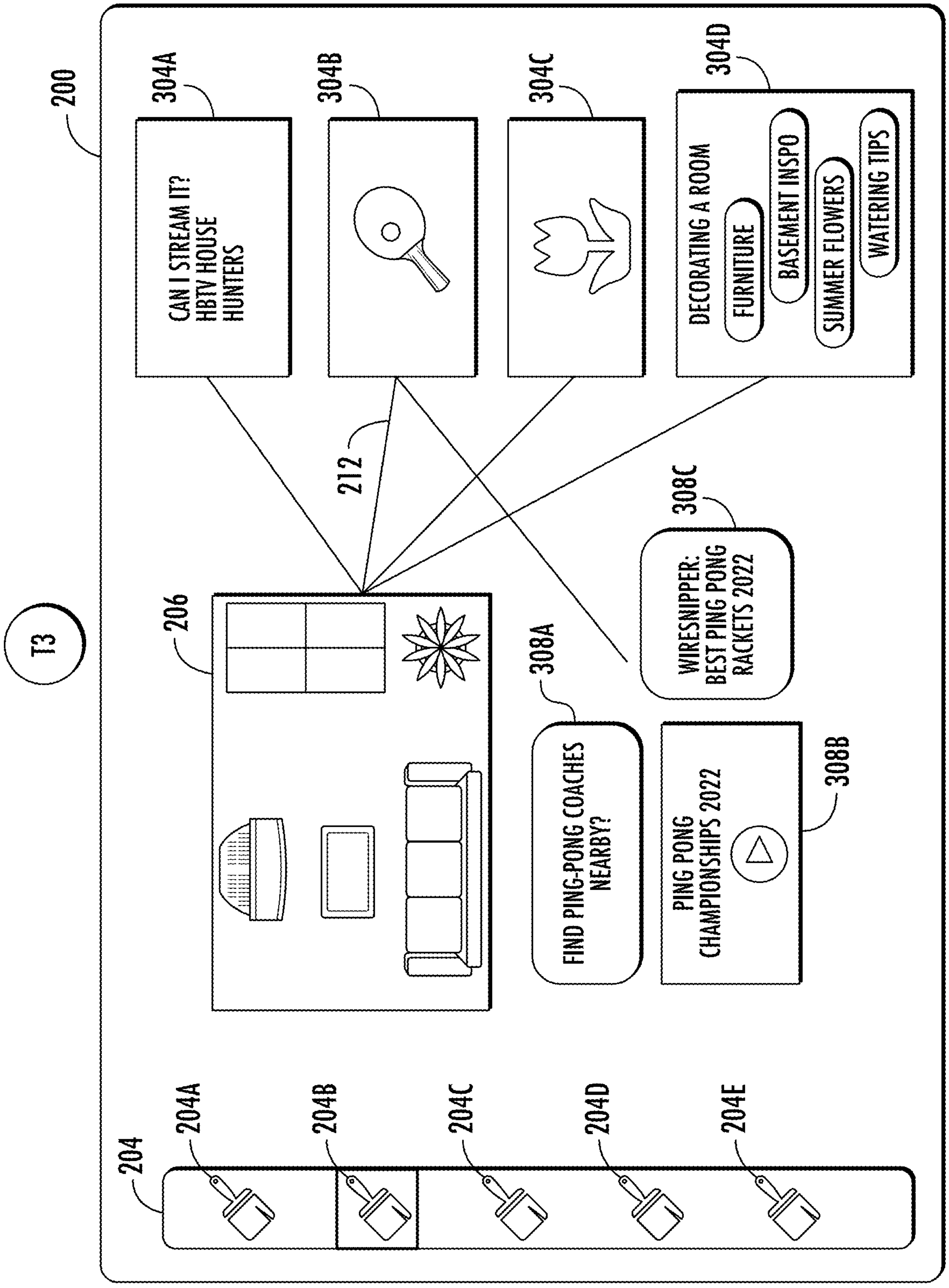
FIG. 3C depicts predicted content elements corresponding to selection of the predicted content element within the interface at a third time according to some implementations of the present disclosure.

FIG. 3C depicts predicted content elements corresponding to selection of the predicted content element 304B within the interface 200 at a third time according to some implementations of the present disclosure. Specifically, at time T3, the second content elements 308A, 308B, and 308C can be generated and depicted within the interface 200 as described with regards to FIG. 2B. As the selection input 306 has selected content element 304B with the content expansion tool 204B, which depicts the image of the ping pong racket, the second content elements 308A-308C can be related to ping pong. For example, the second predicted content element 308A can include a prompt that, if selected by the user, can perform a search for ping pong coaches that are local to the user. The second predicted content element 308B is a video on a video hosting site related to ping pong tournaments. The second predicted content element 308C is an article related to ping pong equipment.

In some implementations, an additional connection element 212 can be generated to link the second predicted content elements 308A-308C to the content element 304B. In such fashion, the predictive content generation space can be utilized as a continuous surface for users to creatively explore content and ideas within a single space.

Figure 4A:
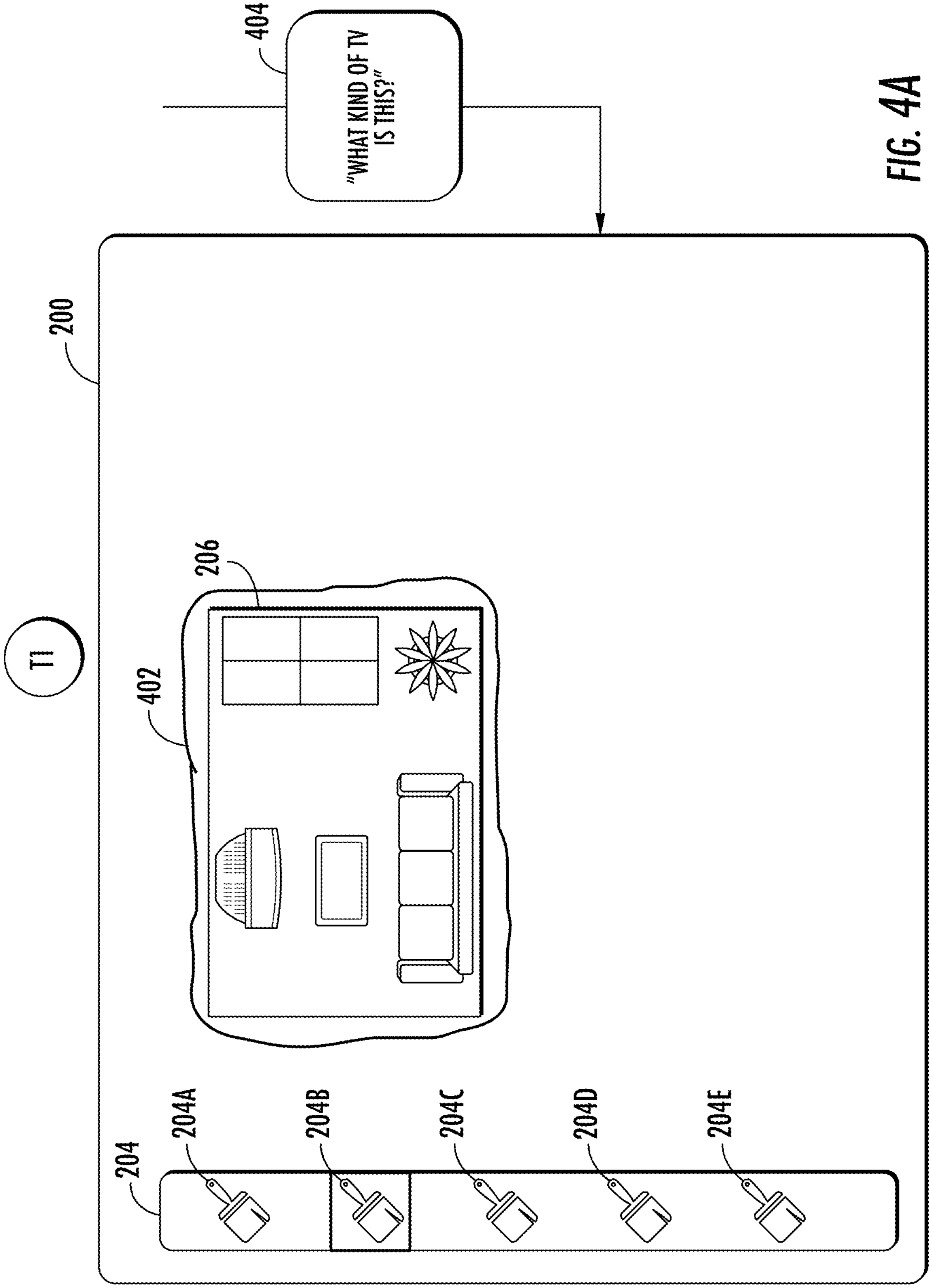
FIG. 4A illustrates an example layout for the interface in which a voice brush is selected alongside a spoken utterance provided by a user at the first time according to some other implementations of the present disclosure.

FIG. 4A illustrates an example layout for the interface 200 in which a voice brush is selected alongside a spoken utterance provided by a user at the first time according to some other implementations of the present disclosure. Specifically, rather than select tool 204B, the user may instead select tool 204C. Tool 204C can correspond to a voice brush tool. The voice brush tool can be configured to select content element(s), or portion(s) of content elements, in the same manner as brushes 204A-B and 204D-E. However, the machine learning task associated with the voice brush tool 204C can be specified by a spoken utterance 404 provided by the user.

For example, the user can provide a selection input 402 using the voice brush tool 204C that selects the entirety of the content element 206. Concurrently, the user can also provide a spoken utterance 404 that indicates an interest in what type of television is depicted within the content element 206. In such fashion, the user can indicate, via the spoken utterance 404, a particular portion, or entity of interest within the content element 206. Additionally, the user can indicate via the spoken utterance 404 which machine learning tasks should be performed. For example, by asking "what kind of TV is this?" The user can indicate that a content analysis task is desired.

In some implementations, the machine learning task indicated by the spoken utterance 404 can be a machine learning task associated with another tool of the toolbar 204. To follow the previous example, the content analysis machine learning task may be associated with tool 204E. However, by indicating the content analysis task via the spoken utterance 404, the content analysis task can be performed without requiring the user to manually select the tool 204E.

In some implementations, the machine learning task indicated by the spoken utterance 404 may not be an explicit match for an existing machine learning task. For example, the user may only indicate an interest in the TV without a corresponding machine learning task (e.g., "that's a nice TV", etc.). In response, a large language model of the machine-learned model(s) 209 may be utilized to determine an intended, or optimal, machine learning task.

In some implementations, the machine learning task may be selected based on user historical data descriptive of prior interactions of the user within the predictive content generation space. For example, the user historical data may indicate that in prior interactions, the user has provided selection inputs similar to selection input 402 using the content expansion tool 204B. Accordingly, the content expansion task may be selected for assignment to the voice brush tool 204C.

Additionally, or alternatively, in some implementations, the machine learning task may be selected based on the data descriptive of at least the portion of the content element. For example, the metadata 214 of FIG. 2D indicates may indicate that the content element 206 includes an image that depicts a television. The user historical data may indicate that user has previously selected images of televisions with the content expansion tool 204B. Alternatively, generalized user history data may indicate that most users who select images of televisions do so with the content expansion tool 204B. In such fashion, a machine learning task can be assigned to the voice brush tool regardless of whether a task is explicitly indicated in the spoken utterance 404.

Figure 4B:
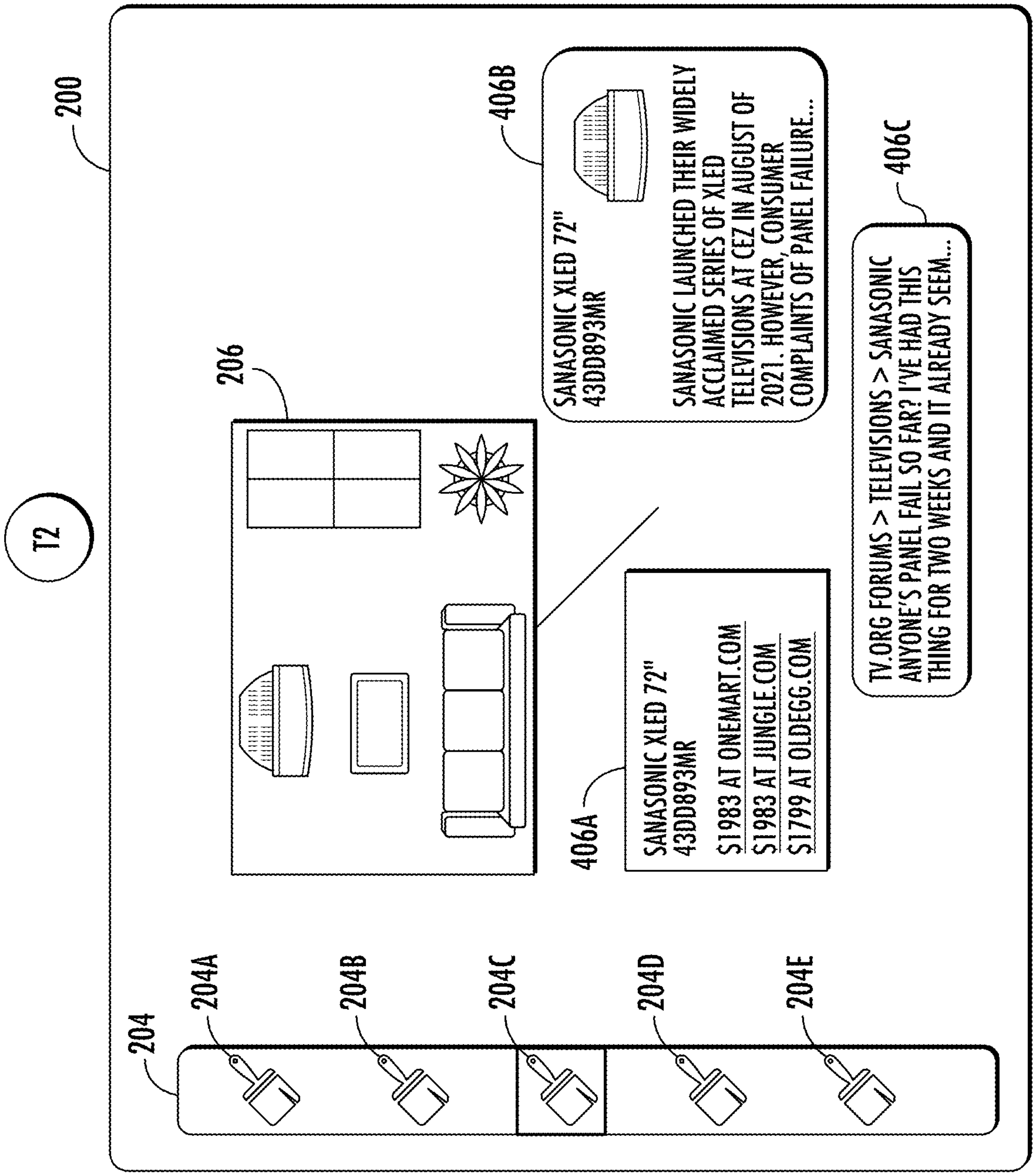
FIG. 4B depicts predicted content elements corresponding to selection of the content element within the interface via the voice brush tool at the second time according to some implementations of the present disclosure.

FIG. 4B depicts predicted content elements corresponding to selection of the content element 206 within the interface 200 via the voice brush tool at the second time according to some implementations of the present disclosure. Specifically, as depicted, the content elements 406A, 406B, and 406C, can be retrieved/generated and depicted within the interface 200 according to the voice brush tool 204C and the spoken utterance 404. In the present example, the content expansion task has been assigned to the voice brush tool 204C according to the spoken utterance 404. For example, predicted content element 406A can include information regarding marketplaces at which the television can be purchased. Predicted content element 406B can be information retrieved from an online dictionary and summarized within the content element. Predicted content element 406C can be a summarization or highlight of information retrieved from an online forum.

It should be noted that, although only a single user is depicted within the present examples as selecting content element(s), implementations of the present disclosure are not limited to a single user. Rather, the predicted content generation space can be utilized by multiple users. For example, the predicted content generation space may be a collective space in which a number of users can interact independently. For example, a first user may generate a "web" of content elements at a first location in the predicted content generation space, and then may move to a second location of the predicted content generation space to generate a new "web" of content elements. At a later time, a second user may explore the predicted content generation space and discover the "web" of content elements at the first location by the first user. The second user can then continue to expand the content elements at the first location, or may move to a different location to create a new web of content elements.

As another example, multiple users may interact with content elements concurrently. For example, two users may select a content element within the predicted content generation space using two different brushes (e.g., one user "brushes" to the right so that additional content elements are generated to the right, while the other user "brushes" to the left so that additional content elements are generated to the left). In such fashion, the multiple users can collectively create a web of content elements as they explore predicted content in a collaborative manner.

As yet another example, a state of the predicted content generation space can be saved and distributed to other users of the predicted content generation space. For example, a user may generate content within an instance of the predicted content generation space. The user can save the state of the predicted content generation space. The state of the predicted content generation space can include any content elements generated within the space, the location of predicted content within the space, and any connection elements that exist to link content elements within the space. The saved state of the predicted content generation space can be provided to some other user who has executed a separate instance of the predicted content generation space. The other user can load the saved state of the predicted content generation space to obtain the saved content elements, locations, connection elements, etc. In such fashion, sessions in which users create and explore predicted content within the predicted content generation space can be shared with other users.

Example Model Arrangements

Figure 6:
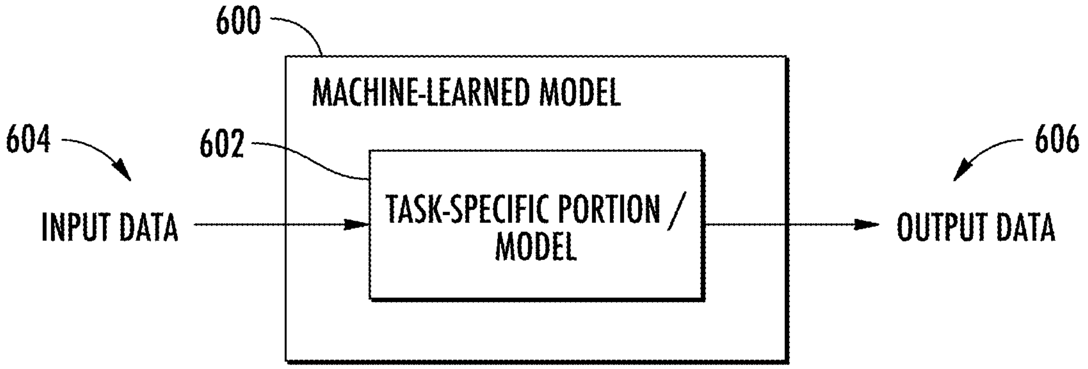
FIG. 6 depicts a block diagram of an example machine-learned model according to some implementations of the present disclosure.

FIG. 6 depicts a block diagram of an example machine-learned model 600 (e.g., machine-learned model(s) 209, machine-learned model(s) 120, machine-learned model(s) 140, etc.) according to some implementations of the present disclosure. In some implementations, the machine-learned model 600 is trained to receive a set of input data 604 descriptive of at least a portion of a content element and, as a result of receipt of the input data 604, provide output data 606 that is, or otherwise indicates, predicted content.

In some implementations, the machine-learned model 600 can include a task-specific portion 602 that is operable to perform certain machine-learned tasks. For example, the machine-learned model 600 may be a large language model trained to perform multiple machine-learned tasks. The task-specific portion 602 can be a portion trained to perform a single task. For example, the task-specific portion 602 may be trained to generate summarizations of information for inclusion within a content element.

Figure 7:
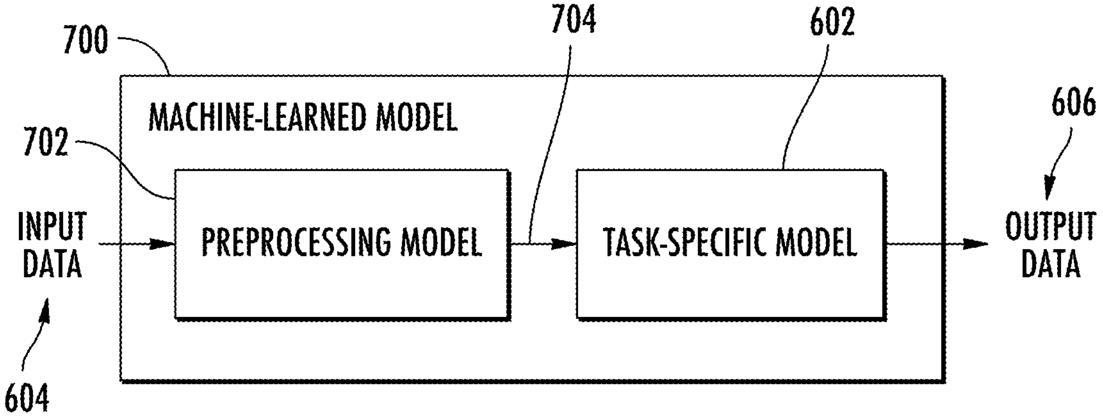
FIG. 7 depicts a block diagram of an example machine-learned model according to some other implementations of the present disclosure.

FIG. 7 depicts a block diagram of an example machine-learned model 700 according to some other implementations of the present disclosure. The machine-learned model 700 is similar to machine-learned model 600 of FIG. 6 except that machine-learned model 700 further includes a preprocessing model 702. The preprocessing model can be any model trained to process the input data 604 to generate an intermediate output 704 that can be processed with the task-specific model 602.

To follow the previous example, the task-specific portion 602 can be configured to summarize retrieved information for inclusion in the content element of output data 606. The input data 604 can be data descriptive of a content element that includes an image. The preprocessing model can be a model trained to semantically process an image to output an intermediate output 704 that includes a semantic description of the image. The intermediate output 704 (i.e., the semantic description of the image) can be processed with the task-specific model 602 to obtain the output data 606 (e.g., the predicted content that includes the summarization).

Figure 8:
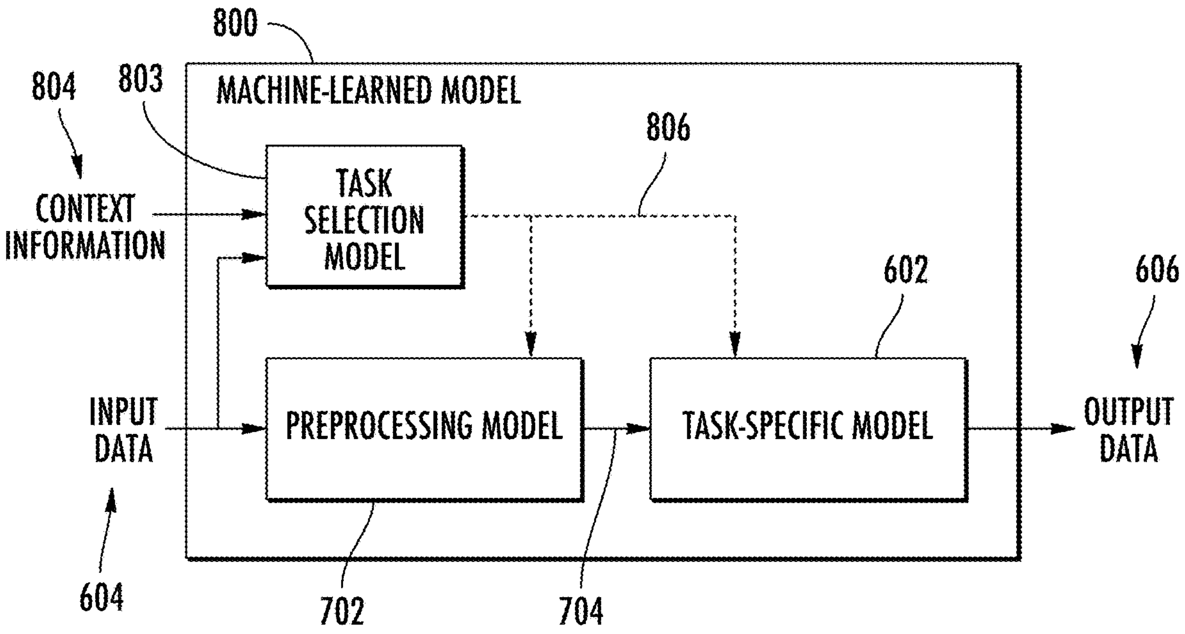
FIG. 8 depicts a block diagram of an example machine-learned model according to some other implementations of the present disclosure.

FIG. 8 depicts a block diagram of an example machine-learned model 800 according to some other implementations of the present disclosure. The machine-learned model 800 is similar to machine-learned model 700 of FIG. 7 except that machine-learned model 800 further includes a task selection model 803. The task selection model 803 can be a model trained to process contextual information 804 to output a selection of a machine learning task.

For example, the contextual information 804 can include user historical data descriptive of a user of the predictive content generation space, as described previously. Additionally, in some implementations, the contextual information 804 may describe a context in which the predictive content generation space is being used (e.g., whether its being used collaboratively, a theme based on all content elements within the space, etc.).

In some implementations, the task selection model 803 can process the context information 804 to obtain a task selection output 806. Additionally, in some implementations, the task selection model can also process the input data 604 that describes the selected content element. The task selection output 806 can be provided to the preprocessing model 702 and the task-specific model 602. To follow the previous example, the task selection model 803 can process context information 804 indicating that the user prefers to utilize a content expansion tool. The task selection model 803 can also process input data 604, which indicates that the content element includes image data (e.g., image data may be strongly correlated with the content expansion task).

The task selection model 803 can provide the task selection output 803 to the preprocessing model 702 and the task specific model 602. For example, the preprocessing model 702 may be a large model configured to trained to perform multiple pre-processing tasks. Based on the task selection output 806, one of the multiple pre-processing tasks can be indicated to the preprocessing model 702. Similarly, the task-specific model 602 may be one of a number of task specific models, or may be a large model trained to perform multiple tasks. Based on the task selection output 806, a model can be selected as the task-specific model 602, or a task can be indicated to the task-specific model 602. In such fashion, multiple conventional and large machine-learned models can be utilized to perform multiple processing operations that facilitate the predictive content generation space.

Example Methods

Figure 9:
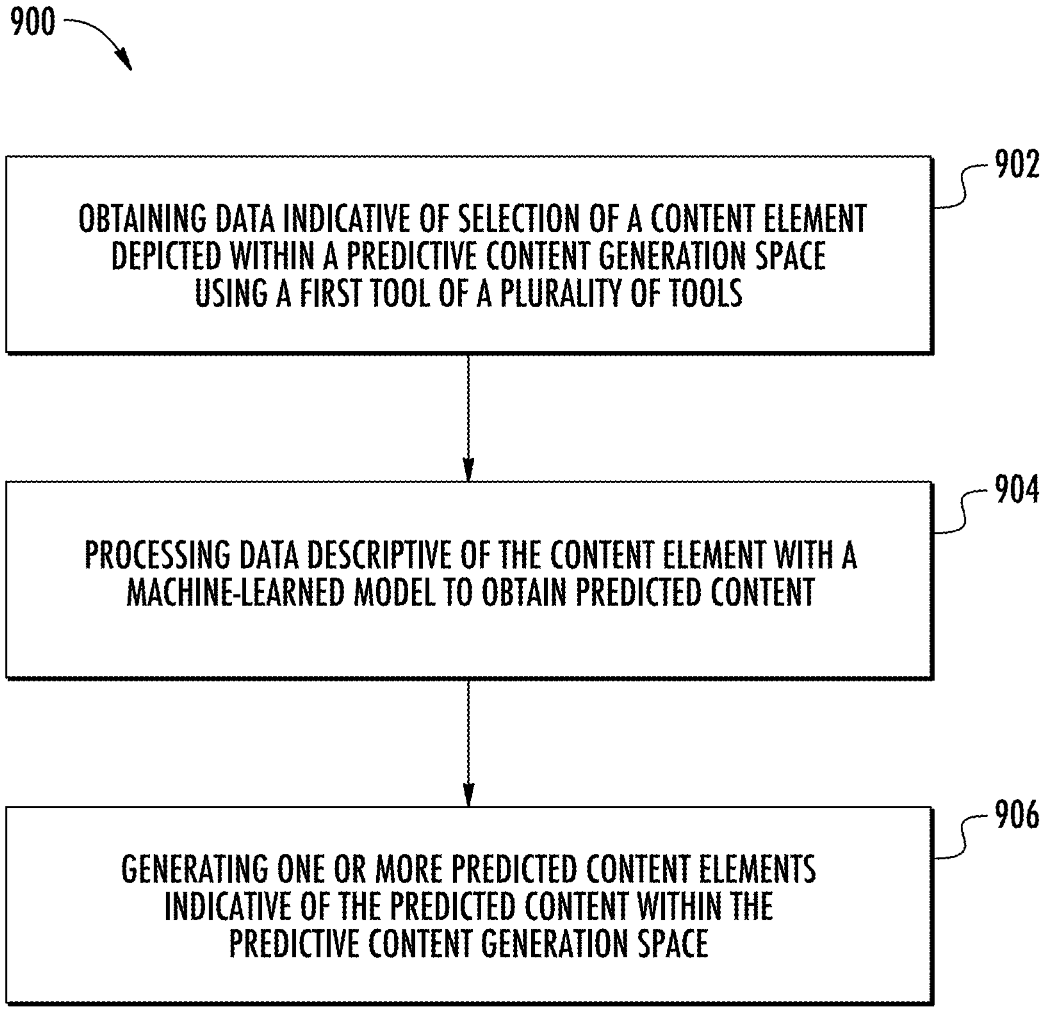
FIG. 9 depicts a flow chart diagram of an example method to perform content generation within a predictive content generation space according to example embodiments of the present disclosure.

FIG. 9 depicts a flow chart diagram of an example method to perform content generation within a predictive content generation space according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system obtains data indicative of selection of a content element depicted within a predictive content generation space using a first tool of a plurality of tools. Specifically, the computing system obtains data indicative of selection, by a user, of at least a portion of a content element depicted within a predictive content generation space using a first tool of a plurality of tools of the predictive content generation space. The plurality of tools can be respectively associated with a plurality of machine learning tasks. Each of the plurality of tools can be operable to select at least a portion of each of one or more content elements depicted within the predictive content generation space.

In some implementations, the first machine learning task can include a content expansion task the machine-learned model is trained to process the data descriptive of the at least the portion of the content element and output content that is similar to the at least the portion of the content element.

In some implementations, the first machine learning task includes a content analysis task and the machine-learned model is trained to process the data descriptive of the at least the portion of the content element and output a summarization of the at least the portion of the content element.

In some implementations, the first machine learning task comprises a prompt generation task the machine-learned model is trained to process the data descriptive of the at least the portion of the content element and output one or more prompts to the user related to aspects of the at least the portion of the content element.

In some implementations, obtaining the data indicative of the selection, by the user, of the at least the portion of the content element further includes selecting a machine learning task from the plurality of machine-learning tasks. The task can be selected based at least in part on historical user data descriptive of prior interactions of the user within the predictive content generation space and/or the data descriptive of the at least the portion of the content element. The computing system can assign the machine learning task to the first tool.

In some implementations, the content element comprises one or more of an image, video data, a three-dimensional representation, textual content, a URL, audio data, a video game, etc.

In some implementations, to obtain the data indicative of the selection, by the user, of the at least the portion of the content element, the computing system can obtain data indicative of selection, by the user, of a first portion of an image. The first portion of the image can depict a first entity and a second portion of the image can depict a second entity different than the first entity.

In some implementations, prior to processing the data descriptive of the at least the portion of the content element with the machine-learned model, the computing system can determine the data descriptive of the at least the portion of the content element. In some implementations, the data descriptive of the at least the portion of the content element can include metadata associated with the content element.

In some implementations, the predictive content generation space is a two-dimensional space. In some implementations, the predictive content generation space is displayed over top of an interface of a separate application. In some implementations, the predictive content generation space is a three-dimensional Augmented Reality (AR)/Virtual Reality (VR) space.

In some implementations, data indicative of selection of a content element can be, or otherwise include, data indicative of a multimodal search query. For example, the content element selected by a user may be a textual query. The user may also select a content element that is an image concurrently with selection of the textual query.

At 904, the computing system processes data descriptive of the content element with a machine-learned model to obtain predicted content. Specifically, the computing system processes data descriptive of the at least the portion of the content element with a machine-learned model to obtain predicted content. The machine-learned model can be trained to perform a first machine learning task respectively associated with the first tool. In some implementations, the predicted content can include predicted content of a first content type that corresponds to the first machine learning task.

In some implementations, the first machine-learning task can be a multimodal search task. To follow the previous example, the user may select multiple content elements to form a multimodal search query (e.g., selecting a textual query, an image, and video data, etc.). The machine-learned model can be trained to retrieve search results based on the multimodal query, or to facilitate multimodal result retrieval (e.g., to generate an embedding that can be utilized to retrieve results from a multimodal search space, etc.).

In some implementations, processing the data descriptive of the at least the portion of the content element includes processing data descriptive of the first portion of the content element with the machine-learned model to obtain predicted content that includes information that identifies one or more images semantically similar to the first portion of the image of the content element.

In some implementations, the machine-learned model can include a plurality of machine-learned models that collectively process an input in an order specified by the corresponding machine learning task.

At 906, the computing system generates one or more predicted content elements within the predictive content generation space. The one or more predicted content elements can be descriptive of the predicted content.

In some implementations, the first machine-learning task can be a machine-learned semantic image retrieval task, and the content element can include an image. To process the data descriptive of the at least the portion of the content element, the computing system can process the data descriptive of the at least the portion of the content element with the machine-learned model to obtain predicted content comprising information that identifies one or more images semantically similar to the image of the content element. To generate the one or more predicted content elements, the computing system can generate one or more predicted content elements within the predictive content generation space that respectively include the one or more images.

In some implementations, the computing system can obtain data indicative of selection, by the user, of a predicted content element of the one or more predicted content elements depicted within the predictive content generation space using a second tool of the plurality of tools different than the first tool. The computing system can process data descriptive of the predicted content element with a machine-learned model to obtain second predicted content. The machine-learned model can be trained to perform a second machine-learning task respectively associated with the second tool. The computing system can generate one or more second predicted content elements within the predictive content generation space. The one or more second predicted content elements can be descriptive of the second predicted content.

In some implementations, the computing system can generate connection elements within the predictive content generation space that depict a connection between the predicted content element and the one or more second predicted content elements.

In some implementations, the machine-learned model comprises a large language model that is trained to perform both the first machine-learning task and the second machine learning task.

In some implementations, the first tool includes a brush tool. Obtaining the data indicative of the selection by the user of the at least the portion of the content element can include obtaining data indicative of a shape generated by the user using the brush tool within the predictive content generation space, and determining that the shape generated by the user selects the at least the portion of the content element depicted within the predictive content generation space.

In some implementations, the shape generated by the user includes a line. Determining that the shape generated by the user selects the at least the portion of the content element can include determining that the line generated by the user intersects the at least the portion of the content element depicted within the predictive content generation space.

In some implementations, the shape generated by the user includes a closed shape. Determining that the shape generated by the user selects the at least the portion of the content element can include determining that the closed shape generated by the user includes the at least the portion of the content element depicted within the predictive content generation space.

In some implementations, the shape generated by the user includes a dot corresponding to a touch input or a click input. Determining that the shape generated by the user selects the at least the portion of the content element can include determining that the dot generated by the user is located at the at least the portion of the content element depicted within the predictive content generation space.

In some implementations, the second tool can include a voice brush tool and the second machine-learned task can include a speech recognition task. Obtaining the data indicative of the selection, by the user, of the predicted content element using the second tool can include obtaining data indicative of a line generated by the user using the voice brush tool within the predictive content generation space. The computing system can determine that the line generated by the user using the voice brush tool intersects the predicted content element depicted within the predictive content generation space. The computing system can obtain data descriptive of a spoken utterance by the user. The spoken utterance can indicate a third tool of the plurality of tools different than the first and second tools. The third tool can be associated with a third machine learning task of the plurality of machine learning tasks. Processing the data descriptive of the predicted content element with the machine-learned model can include processing the data descriptive of the spoken utterance with a machine-learned model trained to perform the second machine learning task to obtain a speech recognition output that identifies the third tool. Based on the speech recognition output, the computing system can process the data descriptive of the predicted content element with a machine-learned model trained to perform the third machine-learning task to obtain the second predicted content.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for content generation within a predictive content generation space via user-specified machine learning tasks, comprising:

obtaining, by a computing system comprising one or more computing devices, data indicative of selection, by a user, of at least a portion of a content element depicted within a predictive content generation space using a first tool of a plurality of tools of the predictive content generation space, wherein:

the plurality of tools are respectively associated with a plurality of machine learning tasks; and each of the plurality of tools is operable to select at least a portion of each of one or more content elements depicted within the predictive content generation space, wherein the first tool comprises a brush tool, wherein the data indicative of the selection of the at least the portion of the content element comprises a shape drawn by the user with the brush tool, wherein the shape selects the at least the portion of the content element, and wherein the selection of the at least the portion of the content element is based on user historical data descriptive of an intent of the user of the predictive content generation space;

processing, by the computing system, data descriptive of the at least the portion of the content element with a machine-learned model to obtain predicted content, wherein the machine-learned model is trained to perform a first machine learning task respectively associated with the first tool; and generating, by the computing system, one or more predicted content elements within the predictive content generation space, wherein the one or more predicted content elements are descriptive of the predicted content.

2. The computer-implemented method of claim 1, wherein the predicted content comprises predicted content of a first content type that corresponds to the first machine learning task.

3. The computer-implemented method of claim 2, wherein:

the first machine learning task is a machine-learned semantic image retrieval task; and the content element comprises an image;

wherein processing the data descriptive of the at least the portion of the content element comprises processing, by the computing system, the data descriptive of the at least the portion of the content element with the machine-learned model to obtain predicted content comprising information that identifies one or more images semantically similar to the image of the content element; and wherein generating the one or more predicted content elements comprises generating, by the computing system, one or more predicted content elements within the predictive content generation space that respectively comprise the one or more images.

4. The computer-implemented method of claim 3, wherein:

obtaining the data indicative of selection, by the user, of the at least the portion of the content element comprises obtaining, by the computing system, data indicative of selection, by the user, of a first portion of the image, wherein the first portion of the image depicts a first entity and a second portion of the image depicts a second entity different than the first entity;

and wherein processing the data descriptive of the at least the portion of the content element comprises processing, by the computing system, data descriptive of the first portion of the content element with the machine-learned model to obtain predicted content comprising information that identifies one or more images semantically similar to the first portion of the image of the content element.

5. The computer-implemented method of claim 1, wherein the method further comprises:

obtaining, by the computing system, data indicative of selection, by the user, of a predicted content element of the one or more predicted content elements depicted within the predictive content generation space using a second tool of the plurality of tools different than the first tool;

processing, by the computing system, data descriptive of the predicted content element with a machine-learned model to obtain second predicted content, wherein the machine-learned model is trained to perform a second machine learning task respectively associated with the second tool; and generating, by the computing system, one or more second predicted content elements within the predictive content generation space, wherein the one or more second predicted content elements are descriptive of the second predicted content.

6. The computer-implemented method of claim 5, wherein the method further comprises generating, by the computing system, connection elements within the predictive content generation space that depict a connection between the predicted content element and the one or more second predicted content elements.

7. The computer-implemented method of claim 5, wherein the machine-learned model comprises a large language model that is trained to perform both the first machine learning task and the second machine learning task.

8. The computer-implemented method of claim 5, wherein:

the second tool comprises a voice brush tool and the second machine learning task comprises a speech recognition task;

obtaining the data indicative of the selection, by the user, of the predicted content element using the second tool comprises:

obtaining, by the computing system, data indicative of a line generated by the user using the voice brush tool within the predictive content generation space;

determining, by the computing system, that the line generated by the user using the voice brush tool intersects the predicted content element depicted within the predictive content generation space; and obtaining, by the computing system, data descriptive of a spoken utterance by the user, wherein the spoken utterance indicates a third tool of the plurality of tools different than the first and second tools, wherein the third tool is associated with a third machine learning task of the plurality of machine learning tasks; and wherein processing the data descriptive of the predicted content element with the machine-learned model comprises:

processing, by the computing system, the data descriptive of the spoken utterance with a machine-learned model trained to perform the second machine learning task to obtain a speech recognition output that identifies the third tool; and based on the speech recognition output, processing, by the computing system, the data descriptive of the predicted content element with a machine-learned model trained to perform the third machine learning task to obtain the second predicted content.

9. The computer-implemented method of claim 1, wherein obtaining the data indicative of the selection by the user of the at least the portion of the content element comprises:

determining, by the computing system, that the shape drawn by the user selects the at least the portion of the content element depicted within the predictive content generation space.

10. The computer-implemented method of claim 9, wherein the shape drawn by the user comprises a line, and wherein determining that the shape drawn by the user selects the at least the portion of the content element comprises determining, by the computing system, that the line drawn by the user intersects the at least the portion of the content element depicted within the predictive content generation space.

11. The computer-implemented method of claim 9, wherein the shape drawn by the user comprises a closed shape, and wherein determining that the shape drawn by the user selects the at least the portion of the content element comprises determining, by the computing system, that the closed shape drawn by the user includes the at least the portion of the content element depicted within the predictive content generation space.

12. The computer-implemented method of claim 9, wherein the shape drawn by the user comprises a dot corresponding to a touch input or a click input, and wherein determining that the shape drawn by the user selects the at least the portion of the content element comprises determining, by the computing system, that the dot drawn by the user is located at the at least the portion of the content element depicted within the predictive content generation space.

13. The computer-implemented method of claim 1, wherein:

the first machine learning task comprises a content expansion task; and the machine-learned model is trained to process the data descriptive of the at least the portion of the content element and output content that is similar to the at least the portion of the content element.

14. The computer-implemented method of claim 1, wherein:

the first machine learning task comprises a content atomization task;

the at least the portion of the content element is associated with a concept; and the machine-learned model is trained to process the data descriptive of the at least the portion of the content element and output one or more sub-concepts of the concept.

15. The computer-implemented method of claim 1, wherein:

the first machine learning task comprises a content analysis task; and the machine-learned model is trained to process the data descriptive of the at least the portion of the content element and output a summarization of the at least the portion of the content element.

16. The computer-implemented method of claim 1, wherein:

the first machine learning task comprises a prompt generation task; and the machine-learned model is trained to process the data descriptive of the at least the portion of the content element and output one or more prompts to the user related to aspects of the at least the portion of the content element.

17. The computer-implemented method of claim 1, wherein obtaining the data indicative of the selection, by the user, of the at least the portion of the content element further comprises:

selecting, by the computing system, a machine learning task from the plurality of machine learning tasks based at least in part on:

historical user data descriptive of prior interactions of the user within the predictive content generation space; and/or the data descriptive of the at least the portion of the content element; and assigning, by the computing system, the machine learning task to the first tool.

18. The computer-implemented method of claim 1, wherein the machine-learned model comprises a plurality of machine-learned models that collectively process an input in an order specified by the corresponding machine learning task.

19. A computing system for content generation within a predictive content generation space via user-specified machine learning tasks, comprising:

one or more processors; and one or more non-transitory computer-readable media that store instructions that, when executed by the one or more processors, cause the computing system to perform operations, the operations comprising:

obtaining data indicative of selection, by a user, of at least a portion of a content element depicted within a predictive content generation space using a first tool of a plurality of tools of the predictive content generation space, wherein:

the plurality of tools are respectively associated with a plurality of machine learning tasks; and each of the plurality of tools is operable to select at least a portion of each of one or more content elements depicted within the predictive content generation space, wherein the first tool comprises a brush tool, wherein the data indicative of the selection of the at least the portion of the content element comprises a shape drawn by the user with the brush tool, wherein the shape selects the at least the portion of the content element, and wherein the selection of the at least the portion of the content element is based on user historical data descriptive of an intent of the user of the predictive content generation space;

processing data descriptive of the at least the portion of the content element with a machine-learned model to obtain predicted content, wherein the machine-learned model is trained to perform a first machine learning task respectively associated with the first tool; and generating one or more predicted content elements within the predictive content generation space, wherein the one or more predicted content elements are descriptive of the predicted content.

20. One or more non-transitory computer-readable media that store instructions that, when executed by one or more processors of a computing system, cause the computing system to perform operations, the operations comprising:

obtaining data indicative of selection, by a user, of at least a portion of a content element depicted within a predictive content generation space using a first tool of a plurality of tools of the predictive content generation space, wherein:

the plurality of tools are respectively associated with a plurality of machine learning tasks; and each of the plurality of tools is operable to select at least a portion of each of one or more content elements depicted within the predictive content generation space, wherein the first tool comprises a brush tool, wherein the data indicative of the selection of the at least the portion of the content element comprises a shape drawn by the user with the brush tool, wherein the shape selects the at least the portion of the content element, and wherein the selection of the at least the portion of the content element is based on user historical data descriptive of an intent of the user of the predictive content generation space;

processing data descriptive of the at least the portion of the content element with a machine-learned model to obtain predicted content, wherein the machine-learned model is trained to perform a first machine learning task respectively associated with the first tool; and generating one or more predicted content elements within the predictive content generation space, wherein the one or more predicted content elements are descriptive of the predicted content.

* * * * *